United States Patent
Lv et al.

(10) Patent No.: US 11,646,417 B2
(45) Date of Patent: May 9, 2023

(54) NEGATIVE ELECTRODE SHEET AND METHOD FOR PREPARING THE SAME, SECONDARY BATTERY, BATTERY MODULE, BATTERY PACK, AND DEVICE

(71) Applicant: CONTEMPORARY AMPEREX TECHNOLOGY CO., LIMITED, Ningde (CN)

(72) Inventors: Zijian Lv, Ningde (CN); Jiazheng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/866,507

(22) Filed: Jul. 16, 2022

(65) Prior Publication Data
US 2022/0367872 A1 Nov. 17, 2022

Related U.S. Application Data

(63) Continuation of application No. PCT/CN2020/140061, filed on Dec. 28, 2020.

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0404* (2013.01); *H01M 4/366* (2013.01);
(Continued)

(58) Field of Classification Search
None
See application file for complete search history.

(56) References Cited

U.S. PATENT DOCUMENTS

| 2018/0261827 | A1 | 9/2018 | Yanagita et al. | |
| 2019/0273248 | A1* | 9/2019 | Yamada | H01M 4/587 |
| 2020/0212439 | A1* | 7/2020 | Zeng | H01M 4/364 |

FOREIGN PATENT DOCUMENTS

| CN | 104885262 A | 9/2015 |
| CN | 109461880 A | 3/2019 |

(Continued)

OTHER PUBLICATIONS

The World Intellectual Property Organization (WIPO) International Search Report and Written Opinion for PCT/CN2020/140061 dated Sep. 28, 2021 14 pages (with translation).

*Primary Examiner* — Jonathan Crepeau
*Assistant Examiner* — Angela J Martin
(74) *Attorney, Agent, or Firm* — Anova Law Group, PLLC

(57) ABSTRACT

A negative electrode sheet includes a current collector, and a first active material layer and a second active material layer that are sequentially provided on at least one surface of the current collector. The first active material layer includes a first negative electrode active material. Particle sizes of the first negative electrode active material satisfy: $0.02 \leq A_1 = (Dn10)_1/(Dv50)_1 \leq 0.2$. The second active material layer includes a second negative electrode active material. Particle sizes of the second negative electrode active material satisfy: $0.02 \leq A_2 = (Dn10)_2/(Dv50)_2 \leq 0.3$; and $A_1$ and $A_2$ satisfy $1 < A_2/A_1 < 2.5$.

19 Claims, 4 Drawing Sheets

(51) Int. Cl.
  *H01M 4/38* (2006.01)
  *H01M 4/62* (2006.01)
  *H01M 10/0525* (2010.01)
  *H01M 4/36* (2006.01)
  *H01M 4/02* (2006.01)

(52) U.S. Cl.
  CPC ........... *H01M 4/386* (2013.01); *H01M 4/625* (2013.01); *H01M 10/0525* (2013.01); *H01M 2004/021* (2013.01); *H01M 2004/027* (2013.01)

(56) References Cited

FOREIGN PATENT DOCUMENTS

| | | | | |
|---|---|---|---|---|
| CN | 110690409 A | | 1/2020 | |
| CN | 110867560 A | | 3/2020 | |
| CN | 110890531 | * | 3/2020 | ........ H01M 10/0525 |
| CN | 110911636 | * | 3/2020 | ........... C01B 33/113 |
| CN | 111129502 A | | 5/2020 | |
| CN | 111540881 A | | 8/2020 | |

* cited by examiner

NEGATIVE ELECTRODE SHEET AND METHOD FOR PREPARING THE SAME, SECONDARY BATTERY, BATTERY MODULE, BATTERY PACK, AND DEVICE

CROSS-REFERENCE TO RELATED APPLICATION

This application is a continuation of International Application No. PCT/CN2020/140061, filed Dec. 28, 2020, the entire content of which is incorporated herein by reference.

TECHNICAL FIELD

The present application belongs to the field of electrochemical technology. More specifically, the present application relates to a negative electrode sheet and a method for preparing the same, a secondary battery, a battery module, a battery pack, and an electrical device.

BACKGROUND ART

With the rapid development of the new energy field, secondary batteries, especially lithium-ion secondary batteries, are widely used in various large power plants, energy storage systems, and various consumer products by virtue of their excellent chemical performance during charge and discharge, memoryless effect, and less environmental pollution.

In recent years, with the wide popularization of electrical devices such as smart phones and electric vehicles, lithium-ion secondary batteries have been widely used. However, in the fast-paced production and life, some electrochemical performance, especially energy density and charge-discharge rate, of lithium-ion secondary batteries cannot meet the demands of users.

Therefore, higher requirements have been put forwards for the development of lithium-ion secondary batteries. For a lithium-ion secondary battery, the negative electrode sheet is the place where lithium ions are intercalated and released during the charge-discharge process of the battery, which has a significant impact on the electrochemical performance of the lithium-ion secondary battery.

Therefore, it is urgent to develop a secondary battery with both high energy density and fast charge capacity.

SUMMARY

In view of the problems in the existing technologies, the present application provides a negative electrode sheet and a method for preparing the same. The secondary battery prepared from the negative electrode sheet of the present application has high battery energy density and high charge-discharge rate, that is to say, it has excellent fast charge performance while ensuring high energy density.

An objective of the present application is to provide a negative electrode sheet with improved charge-discharge rate, and a method for preparing the same.

An objective of the present application is to provide a lithium-ion secondary battery with high energy density and a method for preparing the same.

The inventors have found that by adopting the technical solutions of the present application, one or more of the above objectives can be achieved.

In a first aspect, the present application provides a negative electrode sheet, which comprises a current collector and a first active material layer and a second active material layer that are sequentially provided on at least one surface of the current collector;

wherein the first active material layer includes a first negative electrode active material of which the particle size satisfies formula (I): $0.02 \leq A_1 = (D_n10)_1/(D_v50)_1 \leq 0.2$, formula (I);

wherein the second active material layer includes a second negative electrode active material of which the particle size satisfies formula (II): $0.02 \leq A_2 = (Dn10)_2/(Dv50)_2 \leq 0.3$, formula (II);

and in formula (I) and formula (II), $A_1$ and $A_2$ satisfy $1 < A_2/A_1 < 2.5$.

The secondary battery prepared using the negative electrode sheet provided in the first aspect of the present application has excellent fast charge performance and energy density. In the present application, by providing the first active material layer and the second active material layer on the current collector, the intercalation/deintercalation of lithium ions and the migration rate of lithium ions and electrons are comprehensively improved, so that the overall energy density and charge-discharge rate of the battery are significantly improved.

Additionally, according to the present application, the relative porosity of the first active material layer and the second active material layer is indirectly regulated by regulating the particle sizes of the active materials in the first active material layer and the second active material layer, and then the intercalation/deintercalation of lithium ions in the negative electrode sheet and the migration rate of lithium ions and electrons are regulated by the changes in porosity, thereby improving the energy density and fast charge capacity of the battery. As shown by a lot of research and experiments, when the particle sizes of the first active material and the second active material on the negative electrode sheet satisfy $0.02 \leq A_1 < 0.2$, $0.02 \leq A_2 \leq 0.3$, and $1 < A_2/A_1 < 2.5$ simultaneously, the secondary battery prepared using this negative electrode sheet has both high energy density and high charge-discharge rate.

In any embodiment of the present application, optionally, on the negative electrode sheet of the present application, $(D_v50)_1$ of the first negative electrode active material is 12 μm to 20 μm, optionally 14 μm to 18 μm.

In any embodiment of the present application, optionally, on the negative electrode sheet of the present application, $(D_v50)_2$ of the second negative electrode active material is 8 am to 17 μm, optionally 10 μm to 15 μm.

For the negative electrode sheet provided by the present application, compared with improving the fast charge capacity of the battery, the first active material layer can more significantly improve the overall energy density of the battery; compared with improving the energy density of the battery, the second active material layer can more significantly improve the overall fast charge capacity of the battery, and the present application achieves the above purposes by regulating the particle sizes of particles of the first negative electrode active material and the second negative electrode active material. The particle size range of the negative electrode active material provided by the present application can significantly improve the energy density and fast charge capacity of the battery. That is, when the average particle size $(D_v50)_1$ of the first negative electrode active material is 12 μm to 20 μm, the secondary battery as a whole has a remarkably improved energy density, so that the durability of the battery is remarkably improved; when the average particle size $(D_v50)_2$ of the second negative electrode active material is 12 μm to 20 μm, the secondary battery as a whole has a remarkably improved charge-discharge rate, which significantly improves the fast charge capacity of the battery.

In any embodiment of the present application, optionally, $(D_n10)_1$ of the first negative electrode active material is 0.5 μm to 2 μm, optionally 0.8 μm to 1.8 m; and $(D_n10)_2$ of the second negative electrode active material is 0.5 μm to 2 μm, optional 0.8 μm to 1.8 μm.

As shown by a lot of research and experiments, the value of $D_n10$ can regulate the porosity of the negative electrode active material, which has a significant impact on the conduction of lithium ions and electrons in the charge-discharge process of the battery. The range of $D_n10$ of the negative electrode active material particles provided by the present application can significantly improve the energy density and fast charge capacity of the battery. That is, when the $(D_n10)_1$ of the first negative electrode active material is 0.5 μm to 2 μm and the $(D_n10)_2$ of the second negative electrode active material is 0.5 μm to 2 μm, the secondary battery as a whole has significantly improved charge-discharge rate and energy density, so that the power durability and fast charge capacity of the battery are significantly improved.

In any of the embodiments of the present application, optionally, $(D_v50)_2$ of the second negative electrode active material is less than $(D_v50)_1$ of the first negative electrode active material, and the difference between $(D_v50)_1$ and $(D_v50)_2$ is not less than 3 μm.

As shown by a lot of research and experiments, when $(D_v50)_1$ of the first negative electrode active material is greater than $(D_v50)_2$ of the second negative electrode active material, the second negative electrode active material layer has a relatively high OI value. The relatively high OI value of the second negative electrode active material layer is conducive to improving the overall bonding strength of the negative electrode sheet, and also ensures that the second active material layer has a higher porosity and improves the fast charge capacity of the negative electrode sheet.

In any embodiment of the present application, optionally, the thickness $T_1$ of the first active material layer is 20 μm to 60 μm, optionally 25 μm to 40 μm.

For the negative electrode sheet provided by the present application, the first active material layer thereon is mainly used to improve the overall energy density of the battery, and therefore, a suitable thickness range thereof is conducive to improving the overall power durability of the battery.

In any embodiment of the present application, optionally, the thickness $T_2$ of the second active material layer is 25 μm to 70 μm, optionally 30 μm to 45 μm.

For the negative electrode sheet provided by the present application, the second active material layer thereon is mainly used to improve the overall porosity of the negative electrode sheet, thereby improving the migration rate of lithium ions and electrons. Therefore, an appropriate thickness range thereof is conducive to increasing the overall charge-discharge rate of the battery and improving the fast charge capacity of the battery.

In any embodiment of the present application, optionally, the thickness $T_2$ of the second active material layer is not less than the thickness $T_1$ of the first active material layer.

If the thickness $T_2$ of the second active material layer is smaller than the thickness $T_1$ of the first active material layer, the overall pore content of the electrode sheet will decrease, leading to deteriorated high-rate charge capacity; if the thickness of the second layer of the electrode sheet is much larger than that of the first layer of the electrode sheet, the overall compaction of the electrode sheet is low, which deteriorates the energy density of the battery.

In any embodiment of the present application, optionally, the ratio $T_2/T_1$ of the thickness $T_2$ of the second active material layer to the thickness $T_1$ of the first active material layer is 1.1 to 2.4.

In any embodiment of the present application, optionally, the product of $T_2/T_1$ and $A_2/A_1$ satisfies $1.1 \leq (T_2/T_1) \times (A_2/A_1) \leq 2.9$.

As shown by a lot of research and experiments, the parameter $(T_2/T_1) \times (A_2/A_1)$ can actually characterize the effect of the relationship between the relative thickness of the first active material layer and the second active material layer and the relative porosity of the two layers on battery performance. When the product of $T_2/T_1$ and $A_2/A_1$ satisfies: $1.1 \leq (T_2/T_1) \times (A_2/A_1) \leq 2.9$, the overall thickness distribution of the negative electrode sheet is reasonable, and the pore distribution is reasonable. The battery has both high energy density and fast charge performance.

In any embodiment of the present application, optionally, the first negative electrode active material includes graphite, and optionally, the first negative electrode active material consists of pure graphite; and/or the second negative electrode active material includes graphite and silicon, and optionally, the second negative electrode active material consists of graphite and silicon.

In any embodiment of the present application, optionally, in the second negative electrode active material, in terms of mass percentage, the content of the silicon converted into silicon monoxide accounts for 1-20%, optionally 2-15% of the second negative electrode active material.

The first negative electrode active material includes graphite, and the first active material layer has a low pore content, which helps to improve the overall compaction performance of the electrode sheet and increase the energy density of the battery.

In the negative electrode sheet provided by the present application, the pore content of the second active material layer is high, which is not conducive to the increase of the compaction density of the second negative electrode active material to a certain extent. Distributing silicon in the second active material layer significantly increases the gram capacity of the second active material layer. As a result, in the high-rate charge-discharge process of the battery, more lithium ions are intercalated or deintercalated more quickly, and the overall fast charge capacity and power durability of the battery are significantly improved. However, excessive silicon will lead to rapid decay of cycle life of the battery, so there is a suitable range for the content of silicon monoxide, that is, the content of silicon monoxide accounts for 1-20% of the total content of the second negative electrode active material.

In any embodiment of the present application, optionally, the graphite in the first and second negative electrode active materials is selected from artificial graphite, and the artificial graphite is primary particle and/or secondary particle;

Optionally, the graphite in the first negative electrode active material is primary particle, and the graphite in the second negative electrode active material is secondary particle.

The first negative electrode active material is primary particle, which helps to improve the overall compaction performance of the electrode sheet and increase the energy density of the battery. The second layer of graphite uses secondary particles formed by agglomeration of primary particles, which helps to increase the pores between particles, effectively improves the liquid retention capacity of the material, and provides more liquid carriers for improving the transport rate of lithium ions for the transport of lithium ions in the negative electrode active material, thereby increasing the charge-discharge rate of the battery.

A first aspect of the present application provides a method for preparing a negative electrode sheet, comprising the following steps:

Step S1: providing a first negative electrode active material of which the particle size satisfies formula (I): $0.02 \leq A_1 = (D_n10)_1/(D_v50)_1 \leq 0.2$, formula (I);

Step S2: preparing a slurry A containing the first negative electrode active material;

Step S3: providing a second negative electrode active material of which the particle size satisfies formula (II): $0.02 \leq A_2 = (D_n10)_2/(D_v50)_2 \leq 0.3$, formula (II);

Step S4: preparing a slurry B containing the second negative electrode active material;

Step S5: coating slurry A on at least one surface of a current collector to form a first active material layer; coating slurry B on the surface of the first active material layer to form a second active material layer; then oven drying, cold pressing, slitting, and die cutting to obtain the negative electrode sheet; wherein the $A_1$ and the $A_2$ satisfy $1 < A_2/A_1 < 2.5$.

In any embodiment of the present application, optionally, in step S1, the first negative electrode active material is prepared by processes of raw material selection, shaping and classification, graphitization, and demagnetization and sieving sequentially to obtain the first negative electrode active material with an average particle size $(D_v50)_1$ from 12 μm to 20 μm.

In any embodiment of the present application, optionally, in step S3, the second negative electrode active material includes graphite and silicon; among them, the graphite is prepared by processes of raw material selection, shaping and classification, granulation, graphitization, carbonization, demagnetization and sieving sequentially; the preparation of silicon comprises a process of carbon cladding; the aforementioned graphite and the aforementioned silicon are mixed to obtain the second negative electrode active material with an average particle size $(D_v50)_2$ from 8 μm to 17 μm.

In any embodiment of the present application, optionally, in step S2 and step S4, a conductive agent includes one or more of conductive carbon black, graphene, vapor grown carbon fiber VGCF, and carbon nanotube;

optionally, the mass ratio of the negative electrode active material, the conductive agent, a binder, and a thickener is negative electrode active material:conductiveagent:binder:thickener=50-200:1:0.8-4:0.5-1.5.

In any embodiment of the present application, optionally, in step S4, the second negative electrode active material includes silicon and graphite, and the conductive agent includes graphene or carbon nanotube;

optionally, the mass ratio of silicon to graphene or silicon to carbon nanotube is 100-200:1.

The method for preparing a negative electrode sheet provided in the second aspect of the present application has the advantages of simple preparation process and low cost of raw materials, which is favorable for large-scale industrialization. The negative electrode sheet prepared according to the method of the present application is an indispensable raw material for preparing a battery with both fast charge capacity and high energy density.

A third aspect of the present application provides a secondary battery, which comprises the negative electrode sheet of the first aspect of the present application or a negative electrode sheet prepared according to the method of the second aspect of the present application.

A fourth aspect of the present application provides a battery module comprising the secondary battery of the third aspect of the present application.

A fifth aspect of the present application provides a battery pack comprising one or more of the secondary battery of the third aspect of the present application or the battery module of the fourth aspect of the present application.

A sixth aspect of the present application provides an electrical device, which comprises one or more of the secondary battery of the third aspect of the present application, the battery module of the fourth aspect of the present application, or the battery pack of the fifth aspect of the present application; the secondary battery, the battery module, or the battery pack can be used as a power source of the electrical device or as an energy storage unit of the electrical device.

The present application provides a negative electrode sheet. By arranging a first active material layer and a second active material layer, and by adjusting the particle size of the first active material and the particle size of the second active material, a negative electrode sheet with reasonable pore distribution is obtained. When the particle sizes of the first active material and the second active material on the negative electrode sheet satisfy $0.02 \leq A_1 \leq 0.2$, $0.02 \leq A_2 \leq 0.3$, and $1 < A_2/A_1 < 2.5$ simultaneously, a negative electrode sheet system with high energy density and high dynamics is obtained, and the secondary battery prepared using this negative electrode sheet has both high energy density and fast charge capacity.

DESCRIPTION OF REFERENCE NUMERALS

Figure 1:
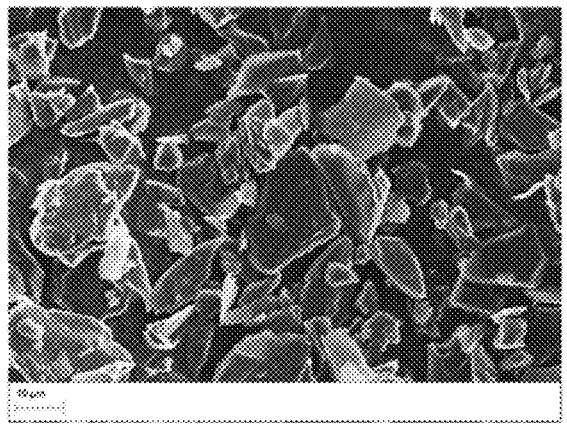
FIG. 1 is a scanning electron microscope image of a first negative electrode active material according to an embodiment of the present application.

1 Battery pack
2 Upper box
3 Lower box
4 Battery module
Secondary battery
51 Case
52 Electrode assembly
53 Top cover assembly

DETAILED DESCRIPTION

Hereinafter, embodiments that specifically disclose a negative electrode sheet and a method for manufacturing the same, a positive electrode sheet, a secondary battery, a battery module, a battery pack, and an electrical device of the present application will be described in detail with reference to the accompanying drawings as appropriate. However, unnecessary detailed descriptions may be omitted in some cases. For example, a detailed description of those well-known or an overlapping description of an actually identical structure may be omitted. This is to prevent the following description from becoming unnecessarily lengthy and to facilitate understanding by those skilled in the art. In addition, the drawings and the following description are provided for those skilled in the art to fully understand the present application, and are not intended to limit the subject matter described in the claims.

For the sake of brevity, the present application specifically discloses some numerical ranges. However, any lower limit can be combined with any upper limit to form an unspecified range; and any lower limit can be combined with any other lower limit to form an unspecified range, and similarly any upper limit can be combined with any other upper limit to form an unspecified range. Furthermore, each individually disclosed point or single value can itself serve as a lower or upper limit in combination with any other point or single value or with other lower or upper limits to form a range not expressly recited.

In the fast-paced production and life, some electrochemical performance, especially battery energy density and charge-discharge rate, of lithium-ion secondary batteries cannot meet the needs of users. Therefore, higher requirements have been put forwards on the development of lithium-ion secondary batteries. Among them, the modification of the negative electrode sheet is an important way to improve the energy density and charge-discharge rate of the battery.

Although the mechanism is not yet clear, the applicant unexpectedly found that the fast charge capacity of the battery has a significant correlation with the pore distribution of the negative electrode sheet. The greater the number of pores in the negative electrode sheet, the more reasonable the distribution, the better the wettability of the electrolyte solution to the negative electrode active material, and the stronger the capacity of the electrode sheet to retain the electrolyte solution. As a result, the conduction resistance of lithium ions between the negative electrode sheet and the electrolyte solution of the present application is significantly reduced, and the transmission path of lithium ions in the negative electrode sheet is significantly reduced, thereby significantly improving the high-rate charge-discharge capacity of the secondary battery.

However, in the existing technologies, the method for evaluating the porosity of the electrode sheet has great limitations, and is greatly affected by the processing of the electrode sheet and whether shedding occurs, and it is difficult to visually evaluate the overall porosity of the electrode sheet. In addition, the overall porosity of the electrode sheet is greatly affected by the thickness of the coated active material, and the existing methods for evaluating the porosity of the electrode sheet cannot be applied to the case where there are active materials of different thicknesses on the current collector, especially when the thickness of the second layer is higher than that of the first layer in double-layer coating.

In view of the above existing problems, the inventors of the present application have developed and designed a negative electrode sheet system with both high energy density and high dynamics after a lot of research and experiments, and the secondary battery prepared using this negative electrode sheet has both high energy density and fast charge capacity. More importantly, with a lot of research and experiments by the inventor, a more visual, more effective and more accurate method for evaluating the overall pore content of the electrode sheet is proposed. The negative electrode sheet designed and developed according to this evaluation method has both high energy density and high dynamic properties, which can significantly improve the intercalation/deintercalation of lithium ions, as well as the migration rate of lithium ions and electrons, and finally significantly improve the energy density and charge-discharge rate of the battery.

[Negative Electrode Sheet]

In an embodiment of the present application, a negative electrode sheet comprises a current collector and a first active material layer and a second active material layer that are sequentially provided on at least one surface of the current collector;

wherein the first active material layer includes a first negative electrode active material of which the particle size satisfies formula (I): $0.02 \leq A_1 = (Dn10)_1/(Dv50)_1 \leq 0.2$, formula (I);

wherein the second active material layer includes a second negative electrode active material of which the particle size satisfies formula (II): $0.02 \leq A_2 = (Dn10)_2/(Dv50)_2 \leq 0.3$, formula (II);

and, in formula (I) and formula (II), $A_1$ and $A_2$ satisfy $1 < A_2/A_1 < 2.5$.

By adjusting the particle size range of the first active material and the second active material, the inventors obtained a negative electrode sheet with both high energy density and high dynamics, and obtained a more effective and accurate method for evaluating the overall pore content of the electrode sheet: when the particle sizes of the first active material and the second active material on the negative electrode sheet satisfy $0.02 \leq A_1 \leq 0.2$, $0.02 \leq A_2 \leq 0.3$ and $1 < A_2/A_1 < 2.5$ simultaneously, the secondary battery prepared using this negative electrode sheet has both high energy density and high charge-discharge rate.

In the evaluation formula proposed in the present application, $D_n10$ represents the particle size corresponding to the cumulative quantity percentage of the negative electrode active material reaching 10% (i.e., the number of particles in the negative electrode active material that have a particle size smaller than $D_n10$ is 10% of the total number of all particles in the negative electrode active material), and $D_v50$ represents the particle size corresponding to the cumulative volume percentage of the negative electrode active material reaching 50% (i.e., the volume of particles in the negative electrode active material that have a particle size smaller than $D_v50$ is 50% of the total volume of all particles in the negative electrode active material, and $D_v50$ is also referred to as "volume median particle size" or "volume average particle size"). The parameter A ($A=D_n10/D_v50$) represents the filling rate between the negative electrode active material particles, and the value of the parameter A actually represents the pore occupancy in the corresponding active material layer.

As shown by a lot of research and experiments, if the parameter A is too small (when A is less than 0.02), it means that the difference between the particle size $D_n10$ of small particles (or fine powder) and the average particle size $D_v50$ in the negative electrode active material is large, and as a result, when preparing the slurry, small particles tend to fill the space left by large particles, so it is easy to cause pore filling, resulting in a decrease in the pore content of the electrode sheet, which in turn affects the liquid retention effect of the electrode sheet, and cannot achieve high-rate charge and discharge. On the contrary, if the parameter A is too large (when $A_1$ is greater than 0.2 and $A_2$ is greater than 0.3), the particle size of the active material in the active material layer is relatively uniform, and pores are easily formed between particles. At this time, the pore content between the particles is too large, resulting in a low compaction density of the negative electrode active material. With a case of the same size, no more negative electrode sheets can be loaded, thus deteriorating the energy density to a certain extent.

As shown by a lot of research and experiments, when the parameters are $0.02 \le A_1 \le 10.2$, $0.02 \le A_2 \le 0.3$, the negative electrode sheet has a reasonable pore distribution as a whole, and the secondary battery prepared using the negative electrode sheet also has both high energy density and charge-discharge rate.

In particular, the particle sizes of the first negative electrode active material and the second negative electrode active material of the negative electrode sheet of the present application also need to satisfy $1<A_2/A_1<2.5$, that is, to ensure that the pore content of the second active material layer is higher than that of the first active material layer. For a negative electrode with a fixed coating thickness, the second active material layer is in direct contact with the electrolyte solution. If $A_2/A_1<1$, the pore content in the second active material layer provided on the first active material layer is too low, which increases the transmission resistance of lithium ions between the negative electrode sheet and the electrolyte solution, and is not conducive to the overall dynamics of the negative electrode sheet; if $A_2/A_1>2.5$, it is difficult for the negative electrode sheet to maintain a high compaction density as a whole, which affects the energy density of the secondary battery.

Therefore, in the formulas involved in the present application, whether it is $A_1$ controlled by the particle size of the first negative electrode active material particle, $A_2$ controlled by the particle size of the second negative electrode active material particle, or the ratio of $A_2$ to $A_1$, that is $A_2/A_1$, each has its own numerical range.

Specifically, $A_1$ can be 0.03, 0.06, 0.08, 0.13, 0.17, or is within the range obtained by combining any two of the above-mentioned values.

Specifically, $A_2$ can be 0.04, 0.06, 0.08, 0.13, 0.15, 0.25, or is within the range obtained by combining any two of the above-mentioned values.

Specifically, $A_2/A_1$ can be 1.18, 1.5, 1.54, 2.00, 2.46, or is within the range obtained by combining any two of the above-mentioned values.

For the negative electrode sheet provided by the present application, the negative electrode current collector has two opposite surfaces in its thickness direction, and the first active material layer and the second active material layer are provided on either or both of the two opposite surfaces of the negative electrode current collector. Among them, the second active material layer covers the first active material layer, and the first active material layer and the second active material layer respectively include a first negative electrode active material and a second negative electrode active material.

The secondary battery prepared using the negative electrode sheet provided by embodiments of the present application has excellent fast charge capacity and energy density. According to the present application, during charge and discharge of the battery, by providing the first active material layer and the second active material layer on the current collector, the intercalation/deintercalation of lithium ions and the migration rate of lithium ions and electrons are comprehensively improved, so that the overall energy density and charge-discharge rate of the battery are significantly improved.

Additionally, according to the present application, the relative porosity of the first active material layer and the second active material layer is indirectly regulated by regulating the particle sizes of the active materials in the first active material layer and the second active material layer, and then the intercalation/deintercalation of lithium ions in the negative electrode sheet and the migration rate of lithium ions and electrons are regulated by the changes in porosity, thereby improving the energy density and fast charge capacity of the battery. As shown by a lot of research and experiments, when the particle sizes of the first active material and the second active material on the negative electrode sheet satisfy $0.02 \le A_1 \le 0.2$, $0.02 \le A_2 <_{0.3}$ and $1<A_2/A_1<2.5$ simultaneously, the secondary battery prepared using this negative electrode sheet has both high energy density and high charge-discharge rate.

In an embodiment of the present application, optionally, on the negative electrode sheet of the present application, the $(D_v50)_1$ of the first negative electrode active material is 12 μm to 20 μm, optionally 14 μm to 18 μm.

In an embodiment of the present application, optionally, on the negative electrode sheet of the present application, the $(D_v50)_2$ of the second negative electrode active material is 8 μm to 17 μm, optionally 10 μm to 15 μm.

In an embodiment of the present application, optionally, the $(D_v50)_2$ of the second negative electrode active material is smaller than the $(D_v50)_1$ of the first negative electrode active material, and the difference between $(D_v50)_1$ and $(D_v50)_2$ is not less than 3 μm.

After enough and numerous experimentations, the inventors found that the smaller the average particle size $D_v50$ of the negative electrode active material particles, the smaller the charge exchange resistance of ions and electrons on the surface of the negative electrode active material when the battery is charged and discharged at a high rate, and the faster the electrochemical reaction rate; and, the smaller the $D_v50$, the smaller the diffusion resistance of lithium ions inside the bulk phase of the negative electrode sheet. However, when the $D_v50$ is too small, the specific surface area of the negative electrode active material particles is significantly increased, which intensifies the side reactions in the charge-discharge process of the battery, thereby affecting the electrochemical performance of the secondary battery.

According to the evaluation formula of the overall porosity of the negative electrode sheet of the present application, the purpose of regulating the porosity of the negative electrode active material layer can be achieved by adjusting the value of the average particle size $D_v50$, thereby realizing the regulation of intercalation/deintercalation of lithium ions and migration rate of lithium ions and electrons. Because the $(D_v50)_2$ of the second negative electrode active material is smaller than the $(D_v50)_1$ of the first negative electrode active material, compared with increasing the fast charge capacity of the battery, the first active material layer improves the overall energy density of the battery more significantly; and compared with increasing the energy density of the battery, the second active material layer improves the overall fast charge capacity of the battery more significantly. Therefore, the present application can significantly improve the energy density and fast charge capacity of the battery by adjusting the average particle size $D_v50$ of the particles of the first negative electrode active material and the second negative electrode active material.

After a lot of research and experiments, the inventors also found that when the $(D_v50)_1$ of the first negative electrode active material is larger than the $(D_v50)_2$ of the second negative electrode active material, the second negative electrode active material layer has a relatively high OI value. The relatively high OI value of the second negative electrode active material layer is conducive to improving the overall bonding strength of the negative electrode sheet while ensuring that the second active material layer has a higher porosity, thereby improving the fast charge capacity of the negative electrode sheet.

Therefore, in the present application, whether it is the average particle size $(D_v50)_1$ of the first negative electrode active material particles, or the average particle size $(D_v50)_2$ of the second negative electrode active material particles, or the difference between the two parameters, each has its own range of values. Specifically, $(D_v50)_1$ can be 12 µm, 13 µm, 16 µm, or is within the range obtained by combining any two of the above values. Specifically, $(D_v50)_2$ can be 8 µm, 13 µm, 17 µm, or is within the range obtained by combining any two of the above values.

In one embodiment of the present application, optionally, the $(D_n10)_1$ of the first negative electrode active material is 0.5 µm to 2 µm, optionally 0.8 µm to 1.8 m; the $(D_n10)_2$ of the second negative electrode active material is 0.5 µm to 2 µm, optionally 0.8 µm to 1.8 µm.

$D_n10$ represents the particle size corresponding to the cumulative quantity percentage of the negative electrode active material reaching 10%, which reflects the particle size of the smaller particles (or fine powder) in the negative electrode active material particles. According to the evaluation formula of the overall porosity of the negative electrode sheet of the present application, when $D_v50$ is a constant value, the purpose of regulating the porosity of the negative electrode active material layer can be achieved by adjusting the value of $D_n10$, thereby realizing the regulation of intercalation/deintercalation of lithium ions and migration rate of lithium ions and electrons. By keeping $D_n10$ in an appropriate range, on the one hand, the reduction of energy density of the secondary battery due to excessively high overall porosity in the negative electrode sheet can be avoided; on the other hand, the increase of the transmission resistance of lithium ions between the negative electrode sheet and the electrolyte solution as a result of filling of the space between particles by small particles (or fine powder) can be avoided, thereby improving the fast charge capacity of the secondary battery.

Therefore, in the present application, whether it is the $(D_n10)_1$ of the first negative electrode active material particles, or the $(D_n10)_2$ of the second negative electrode active material particles, each has its own range of values. Specifically, $(D_n10)_1$ can be 0.5 µm, 1 µm, 2 µm, or is within the range obtained by combining any two of the above values. Specifically, $(D_n10)_2$ can be 0.5 µm, 1 µm, 2 µm, or is within the range obtained by combining any two of the above values.

In the present application, in order to more strictly test the $D_n10$ and $D_v50$ of the first negative electrode active material and the second negative electrode active material, the present application adopts two test methods, namely forward test and backward test.

The forward test method is as follows:
after the first negative electrode active material and the second negative electrode active material are prepared, their $D_n10$ and $D_v50$ are tested according to the test method of GB/T19077-2016, using a laser diffraction particle size distribution measuring instrument (Mastersizer3000).

The backward test method is as follows:
method to take powder from the first active material layer and the second active material layer: a negative electrode sheet to be tested is taken, subjected to the processes of dimethyl carbonate washing, deionized water washing, filtration, and oven drying sequentially, and then subjected to ion polishing cross-section analysis test to obtain the thickness distribution of the first active material layer and the second active material layer.

According to the thickness distribution, firstly, the powder of the second active material layer is scraped, the scraping thickness of the second layer is controlled below 10 µm, and the thickness change is monitored by a micrometer; the powder on the current collector is completely torn off with a strong adhesive tape and reversely scraped to obtain the powder of the first active material layer.

The resultant powder is calcined in an air atmosphere at 500° C. to remove organic components, thereby obtaining a powder 1 of the first active material layer and a powder 2 of the second active material layer for testing. Then, according to the test method of GB/T19077-2016, the $D_n10$ and $D_v50$ of powder 1 and powder 2 are measured with a laser diffraction particle size distribution measuring instrument (Mastersizer3000).

Note: For powder 1 and powder 2, the conductive agent content therein is very low, and the particle size of the added conductive agent is nanoscale. Therefore, in the present application, the conductive agent has basically no effect on the particle size of the first negative electrode active material and the second negative electrode active material, that is, the measured particle size of powder 1 and powder 2 can be regarded as the particle size of the first negative electrode active material and the second negative electrode active material.

This conclusion has been verified by rigorous experiments. The particle size of the first active material and the particle size of the mixture of the first negative electrode active material and the conductive agent are tested respectively. The experimental process for the second negative electrode active material is the same as that of the first negative electrode active material. The test results are as follows:

| Different particle size parameters | First negative electrode active material/μm | First negative electrode active material + conductive agent/μm | Second negative electrode active material/μm | Second negative electrode active material + conductive agent/μm |
|---|---|---|---|---|
| Dv10 | 5.6 | 5.8 | 7.7 | 7.1 |
| Dv50 | 17.7 | 17.4 | 14.6 | 14.3 |
| Dv90 | 36.9 | 38.7 | 26.2 | 27 |
| Dv99 | 58 | 65.3 | 37.6 | 40.2 |
| Dn10 | 0.96 | 0.83 | 1.6 | 1.2 |

In an embodiment of the present application, optionally, the thickness $T_1$ of the first active material layer is 20 μm to 60 μm, optionally 25 μm to 40 μm.

For the negative electrode sheet provided by the present application, the first active material layer thereon is mainly used to improve the overall energy density of the battery, and therefore, a suitable thickness range thereof is conductive to improving the overall power durability of the battery. Optionally, the $T_1$ of the first active material layer may be 20 μm, 30 μm, 60 μm.

In an embodiment of the present application, optionally, the thickness $T_2$ of the second active material layer is 25 am to 70 μm, optionally 30 am to 45 am.

For the negative electrode sheet provided by the present application, the second active material layer thereon is mainly used to improve the overall porosity of the negative electrode sheet, thereby improving the migration rate of lithium ions and electrons. Therefore, a suitable thickness range thereof is conductive to improving the overall charge-discharge rate of the battery and increasing the fast charge capacity of the battery. Optionally, the $T_2$ of the second active material layer may be 25 μm, 35 μm, or 70 μm.

In an embodiment of the present application, optionally, the thickness $T_2$ of the second active material layer is not less than the $T_1$ of the first active material layer.

In an embodiment of the present application, optionally, the ratio of the thickness $T_2$ of the second active material layer to the thickness $T_1$ of the first active material layer, that is $T_2/T_1$, is 1.1 to 2.4. Optionally, $T_2/T_1$ may be 1.17, 2.33.

For the negative electrode sheet of the present application, the second active material layer thereon is an active material layer that is in direct contact with the electrolyte solution. Therefore, in the present application, by adjusting the particle size of each active material layer, the second active material layer with a higher porosity is used as a fast charge layer that significantly improves the overall charge-discharge rate of the battery, while the first active material layer with a lower porosity is used as an energy layer that significantly improves the overall energy density of the battery, thereby comprehensively improving the overall energy density and charge-discharge rate of the secondary battery. Therefore, if the thickness $T_2$ of the second active material layer is smaller than the thickness $T_1$ of the first active material layer, the overall pore content of the electrode sheet will decrease, and the high-rate charge capacity will be deteriorated; if the thickness of the second layer of the electrode sheet is much larger than that of the first layer of the electrode sheet, it will significantly affect the overall compaction density of the electrode sheet and deteriorate the overall energy density of the secondary battery.

Therefore, for the first active material layer and the second active material layer, the thickness $T_2$ of the second active material layer is not less than the thickness $T_1$ of the first active material layer.

In an embodiment of the present application, optionally, the product of $T_2/T_1$ and $A_2/A_1$ satisfies: $1.1 \leq (T_2/T_1) \times (A_2/A_1) \leq 2.9$. Optionally, $(T_2/T_1) \times (A_2/A_1)$ can be 1.38, 1.44, 2.33, 2.87.

As verified by a lot of research and experiments, with $A_2/A_1$ being a fixed value, if the ratio $T_2/T_1$ is too high, the overall pore content of the electrode sheet will be too high, the compaction density will decrease, and the overall energy density of the battery will be reduced, and when the thickness $T_2$ of the second active material layer is too large, it will also have an adverse effect on the fast charge capacity. With $T_2/T_1$ being a fixed value, if the ratio $A_2/A_1$ is too high, the overall pore content of the electrode sheet will be too high, the compaction density will decrease, and the overall energy density of the battery will be reduced. Therefore, the parameter $(T_2/T_1) \times (A_2/A_1)$ can actually characterize the effect of the relationship between the relative thickness of the first active material layer and the second active material layer and the relative porosity of the two layers on battery performance. When the product of $T_2/T_1$ and $A_2/A_1$ satisfies: $1.1 \leq (T_2/T_1) \times (A_2/A_1) \leq 2.9$, the overall thickness distribution of the negative electrode sheet is reasonable, the pore distribution is reasonable, and the battery has both high energy density and fast charge performance.

In an embodiment of the present application, optionally, the first negative electrode active material includes graphite, and optionally, the first negative electrode active material consists of pure graphite; and/or, the second negative electrode active material includes graphite and silicon, and optionally, the second negative electrode active material consists of graphite and silicon.

In an embodiment of the present application, optionally, in the second negative electrode active material, in terms of mass percentage, the content of silicon converted into silicon monoxide accounts for 1-20%, optionally 2-15% of the second negative electrode active material.

The first negative electrode active material includes graphite, and the first active material layer has a low pore content, which helps to improve the overall compaction performance of the electrode sheet and increase the energy density of the battery.

In the negative electrode sheet provided by the present application, the pore content of the second active material layer is high, which is not conducive to the improvement of the compaction density of the second negative electrode active material to a certain extent. Distribution of silicon into the second active material layer can significantly improve the gram capacity of the second active material layer, and make up for the energy density loss of the second active material layer due to a high porosity, so that more lithium ions can be intercalated or deintercalated more quickly in the high-rate charge-discharge process of the battery, and the overall fast charge capacity and power durability of the battery can be significantly improved. However, excessive silicon will lead to rapid decay of battery cycle life, so there is a suitable range for the content of silicon monoxide, that is, the content of silicon monoxide accounts for 1-20% of the total content of the second negative electrode active material. Optionally, the content of silicon monoxide may be 1%, 8%, 20%.

In an embodiment of the present application, optionally, the graphite in the first and second negative electrode active materials is selected from artificial graphite, and the artificial graphite is primary particle and/or secondary particle;

Optionally, the graphite in the first negative electrode active material is primary particle, and the graphite in the second negative electrode active material is secondary particle.

The graphite in the first negative electrode active material is composed of primary particles with less pores between the particles, which helps to improve the overall compaction density of the electrode sheet and increase the energy density of the secondary battery. The graphite in the second negative electrode active material is composed of secondary particles formed by agglomeration of primary particles, which helps to increase the pores between particles, effectively improves the liquid retention capacity of the negative electrode material, provides more liquid carriers for the transmission of lithium ions in the negative electrode active material, and improves the transmission rate of lithium ions, thus improving the charge-discharge rate of the battery.

In an embodiment of the present application, optionally, a method for preparing a negative electrode sheet comprises the following steps:

Step S1: providing a first negative electrode active material of which the particle size satisfies formula (I): $0.02 \leq A_1 = (Dn10)_1/(Dv50)_1 \leq 0.2$, formula (I);

Step S2: preparing a slurry A containing the first negative electrode active material;

Step S3: providing a second negative electrode active material of which the particle size satisfies formula (II): $0.02 \leq A_2 = (Dn10)_2/(Dv50)_2 \leq 0.3$, formula (II);

Step S4: preparing a slurry B containing the second negative electrode active material;

Step S5: coating slurry A on at least one surface of a current collector to form a first active material layer; coating slurry B on the surface of the first active material layer to form a second active material layer; then carrying out oven drying, cold pressing, slitting, and die cutting to obtain the negative electrode sheet; wherein the $A_1$ and the $A_2$ satisfy $1 < A_2/A_1 < 2.5$.

In an embodiment of the present application, optionally, in step S1, the first negative electrode active material is prepared by processes of raw material selection, shaping and classification, graphitization, and demagnetization and sieving sequentially to obtain the first negative electrode active material with an average particle size $(D_v50)_1$ from 12 μm to 20 μm.

In some embodiments of the present application, the first negative electrode active materials with various particle size distributions can be obtained commercially or prepared through artificial processes.

The first negative electrode active material includes graphite, and the average particle size $(D_v50)_1$ of the first negative electrode active material ranges from 12 μm to 20 μm. The processes for obtaining the first negative electrode active material particles with appropriate average particle size roughly include: raw material selection→shaping and classification→graphitization→demagnetization and sieving.

For raw material selection, the raw material used can be any raw material that can provide the first negative electrode active material through the above processes, for example, it can be one or more of pitch coke, petroleum coke and needle coke. The specific selection process is as follows: a mechanical crusher is used to crush the raw material to obtain a first precursor.

After a lot of experiments, the inventors found that the first precursor obtained directly using the mechanical crusher is composed of mostly irregular particles with edges and corners. Such a precursor will bring out many disadvantages if it is directly used for preparing the precursor of the first negative electrode active material without shaping: on the one hand, compared with rounded active material particles, the irregular particles with edges and corners will deteriorate the electrochemical performance of the secondary battery; on the other hand, if the irregular particles with edges and corners are coated onto the current collector, they will easily pierce the separator during winding of the electrode sheet, which brings a great safety hazard to the secondary battery. Therefore, the shaping treatment of the first precursor can not only improve the electrochemical performance of the secondary battery, but also improve the safety performance of the battery.

The shaping process involves shaping irregular particles with edges and corners into relatively rounded particles. In some embodiments of the present application, the shaped first precursor is referred to as a second precursor.

In order to further screen out a more suitable precursor for preparing the first negative electrode active material, the second precursor is transported to an air classifier for classification, and through instant particle size detection, a third precursor with average particle sizes $(D_v50)_1$ from 13 μm to 17 μm and $(D_n10)_1$ from 0.5 μm to 2 μm is obtained.

The shaped and classified third precursor is graphitized at a temperature of 2600-3000° C. to obtain a graphitized first negative electrode active material, that is, a fourth precursor.

The graphitized fourth precursor particles may produce large particles, possibly mixed with metal particles. Therefore, in order to remove the metal particles, the fourth precursor particles are first processed by a demagnetizer, and then sieved by an ultrasonic vibrating sieve to finally obtain the first negative electrode active material with average particle sizes $(D_v50)_1$ from 12 μm to 20 μm and $(D_n10)_1$ from 0.5 μm to 2 μm. For the SEM image of the first negative electrode active material, refer to FIG. 1.

In an embodiment of the present application, optionally, in step S3, the second negative electrode active material includes graphite and silicon; among them, the graphite component is prepared by processes of raw material selection, shaping and classification, granulation, graphitization, carbonization, demagnetization and sieving sequentially, and the preparation of silicon comprises a process of carbon cladding; the graphite component and the silicon component are mixed to obtain the second negative electrode active material with an average particle size $(D_v50)_2$ from 8 μm to 17 μm.

In some embodiments of the present application, the second negative electrode active materials with various particle size distributions can be prepared through artificial processes. The graphite component used for preparing the second negative electrode active material can be obtained commercially or prepared through artificial processes. The silicon precursor used to prepare the silicon component in the second negative electrode active material is commercially available. The silicon precursor $SiO_x$ ($0.5 < x < 0.9$) is purchased from Peixian Rijinwen Silicon Material Co., LTD, with 5 μm≤$D_v50$≤8 μm, 12 m≤$D_v90$≤16 μm, 0.6 m≤$D_n10$≤1.5 μm, specific surface area 0.8-2.2 m²/g, 2V gram capacity 1500-1800 mAh/g.

The second negative electrode active material includes graphite and silicon, and the average particle size $(D_v50)_2$ of the second negative electrode active material ranges from 8 m to 17 μm. In order to obtain second negative electrode active material particles with a suitable average particle size, the graphite therein has roughly gone through the processes of raw material selection→shaping and classification→graphitization→carbonization→demagnetization and sieving; to obtain appropriate silicon, the present application modifies the commercial $SiO_x$ (0.5<x<0.9) by carbon cladding.

For raw material selection, the raw material used can be any raw material that can provide graphite through the above processes. For example, it can be one or more of pitch coke, petroleum coke and needle coke. The specific raw material selection process is as follows: a mechanical crusher is used to crush the raw material to obtain a first graphite precursor.

After a lot of experiments, the inventors found that the first graphite precursor obtained directly using the mechanical crusher is composed of mostly irregular particles with edges and corners. Such a precursor will bring out many disadvantages if it is directly used for preparing the precursor of the second negative electrode active material without shaping: on the one hand, compared with rounded active material particles, the irregular particles with edges and corners will deteriorate the electrochemical performance of the secondary battery; on the other hand, if the irregular particles with edges and corners are coated onto the current collector, they will easily pierce the separator during winding of the electrode sheet, which brings a great safety hazard to the secondary battery. Therefore, the shaping treatment of the second graphite precursor can not only improve the electrochemical performance of the secondary battery, but also improve the safety performance of the battery.

The shaping process involves shaping irregular particles with edges and corners into relatively rounded particles. In some embodiments of the present application, the shaped first graphite precursor is referred to as second graphite precursor.

In order to further screen out a more suitable graphite precursor for preparing the second negative electrode active material, the second graphite precursor is classified through an air classifier, and through instant particle size detection, a third graphite precursor with average particle sizes $(D_v50)_2$ from 6 μm to 8 μm and $(D_n10)_2$ from 0.5 μm to 2 μm is obtained.

The shaped and classified third graphite precursor and pitch are mixed in a mass ratio of 100:(5-20) and then granulated at a temperature of 500-700° C. for 2-6 h to afford a fourth graphite precursor.

The fourth graphite precursor is graphitized at a temperature of 2600-3000° C. to obtain a fifth graphite precursor.

After a lot of experiments, the inventors found that carbon cladding (i.e., carbonization) of the fifth graphite precursor can improve the electrochemical performance of the material on the one hand, and provide stable chemical and electrochemical reaction interfaces for the negative electrode active material on the other hand. The specific carbonization process is as follows:

the fifth graphite precursor and the carbon cladding agent are mixed in a mass ratio of 100:5-20, and then carbonized at 900-1200° C. to obtain a sixth graphite precursor. The carbon cladding agent may be pitch, resin, and the like. Among them, pitch can well modify the surface defects of graphite and greatly improve the performance of the electrode sheet in all aspects.

However, the carbonized sixth graphite precursor particles may have uneven particle sizes, possibly mixed with metal particles. Therefore, in order to remove the metal particles, the precursor is first processed by a demagnetizer, and then sieved by an ultrasonic vibrating sieve to finally obtain the graphite component in the second negative electrode active material with average particle sizes $(D_v50)_2$ from 8.5 μm to 17.5 μm and $(D_n10)_2$ from 0.5 μm to 2 μm.

Figure 2:
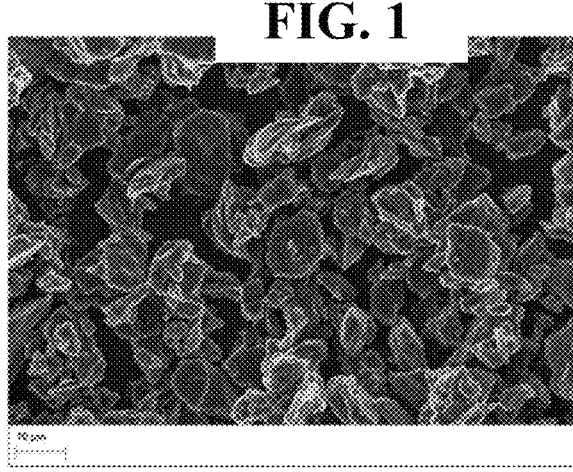
FIG. 2 is a scanning electron microscope image of graphite component in a second negative electrode active material according to an embodiment of the present application.

For the SEM image of the graphite component in the second negative electrode active material, refer to FIG. 2.

Figure 3:
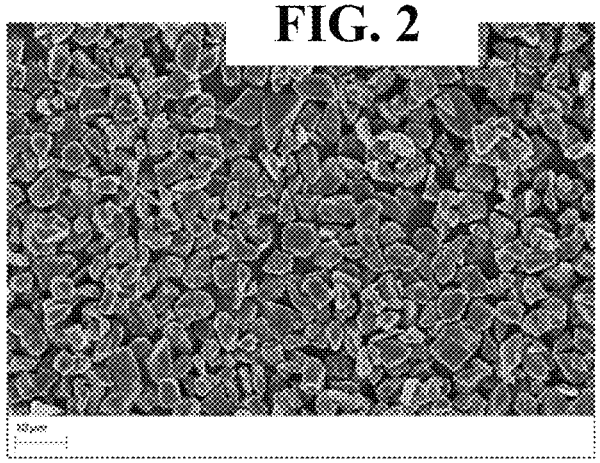
FIG. 3 is a scanning electron microscope image of silicon component in a second negative electrode active material according to an embodiment of the present application.

Modification of commercial silicon precursors by carbon cladding is as follows: using a CVD rotary furnace and using one or more of hydrocarbon gases such as acetylene, methane and ethylene as the carbon source, the silicon precursor $SiO_x$ (0.5<x<0.9) is subjected to carbon cladding by vapor deposition method, with a heat treatment temperature of 800-1000° C., heat treatment time of 2-8 h, carbon source gas flow rate of 0.5-2 L/min, and carbon cladding amount of 2 wt % to 6 wt %, thereby obtaining the silicon component in the second negative electrode active material. For the SEM image of the silicon component in the second negative electrode active material, refer to FIG. 3.

Figure 4:
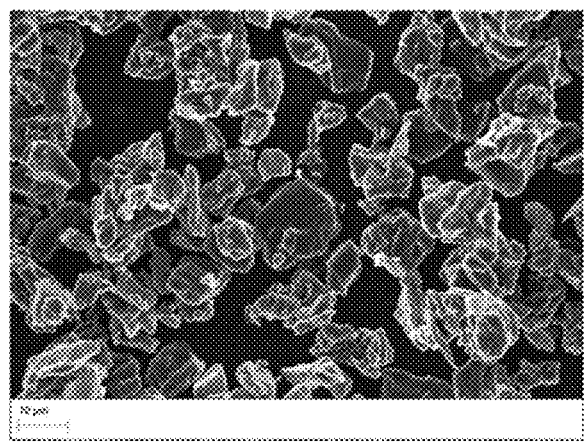
FIG. 4 is a scanning electron microscope image of a second negative electrode active material according to an embodiment of the present application.

After obtaining the graphite component and the silicon component respectively, the two components are placed into a high-efficiency mixer and mixed for 0.5 h to 2 h to obtain the second negative electrode active material having average particle sizes $(D_v50)_2$ from 8 μm to 17 μm, and $(D_n10)_2$ from 0.5 μm to 2 μm. Specifically, the high-efficiency mixer may include other components except the graphite component and the silicon component. For the SEM image of the second negative electrode active material, refer to FIG. 4.

In some embodiments of the present application, optionally, in step S2 and step S4, the conductive agent includes one or more of conductive carbon black, graphene, vapor grown carbon fiber VGCF, and carbon nanotube;

optionally, the mass ratio of the negative electrode active material, the conductive agent, a binder, and a thickener is negative electrode active material:conductiveagent:binder:thickener=50-200:1:0.8-4:0.5-1.5.

The negative electrode slurry is usually formed by dispersing the negative electrode active material and optional conductive agent, binder, thickener, etc. in a solvent and stirring the mixture evenly. The solvent can be N-methyl pyrrolidone (NMP) or deionized water.

Optionally, the conductive agent can be selected from one or more of conductive carbon black, graphene, vapor grown carbon fiber VGCF, and carbon nanotube.

Optionally, the binder can be selected from one or more of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

Optionally, the thickener may be sodium carboxymethyl cellulose (CMC-Na).

In some embodiments of the present application, optionally, in step S4, the second negative electrode active material includes silicon and graphite, the conductive agent includes graphene or carbon nanotube, and the mass ratio of silicon to graphene or carbon nanotube is 100-200:1.

The construction of the conductive network has an impact on maintaining the fast charge performance and cycle performance of the negative electrode sheet. Generally speaking, the point-to-point conductive network is difficult to meet the activity retention rate of the silicon-containing negative electrode active material after cycling and expansion. Therefore, it is necessary to construct point-to-plane or point-to-line conductive networks to effectively maintain the cycle performance and fast charge performance of the second layer. Therefore, in some embodiments, graphene with a two-dimensional structure or carbon nanotubes with a one-dimensional tubular structure is used as conductive agent for the second active material layer.

Secondly, after a lot of research and experiments, the inventors also found that if the amount of graphene or carbon nanotube conductive agent added is too high, it will lead to increased electron and ion conduction paths, and at the same time, it will cover the active site of the negative electrode active material, resulting in deteriorated fast charge performance; on the contrary, if its addition amount is too low, it will be difficult to maintain the excellent conductivity of the electrode sheet, which will adversely affect the battery. In the present application, when the ratio of silicon to graphene or carbon nanotubes is 100-200:1, the battery can perform well in both the fast charge performance and the cycle life.

Figure 5:
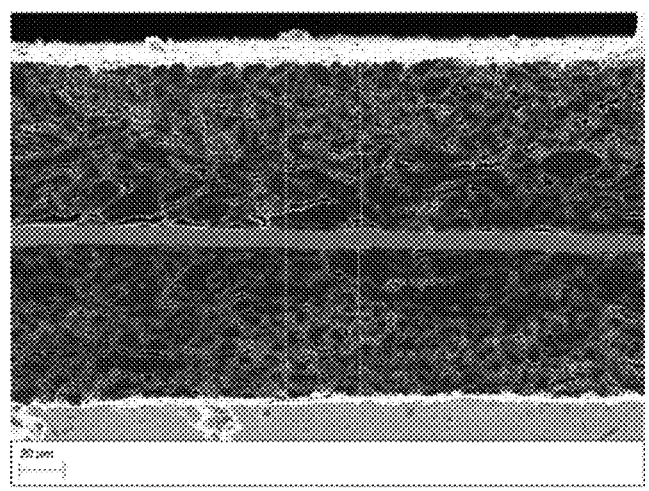
FIG. 5 is a scanning electron microscope image of a negative electrode sheet according to an embodiment of the present application.

In some embodiments of the present application, optionally, in Step S5, the thickness of the first active material layer is 20 μm to 60 μm, and the thickness of the second active material is 25 μm to 70 μm. The second active material layer covers the first active material layer, and refer to FIG. 5 for the specific SEM image.

The preparation method of the negative electrode sheet provided in the present application has the advantages of simple preparation process and low cost of raw materials, which is favorable for large-scale industrialization. The negative electrode sheet prepared according to the method of the present application is an indispensable raw material for preparing a battery with both fast charge capacity and high energy density.

In the negative electrode sheet of the present application, the negative electrode current collector may be a metal foil or a composite current collector. For example, as the metal foil, a copper foil can be used. The composite current collector may include a high molecular material substrate layer and a metal layer formed on at least one surface of the high molecular material substrate. Composite current collectors can be prepared by placing metal materials (copper, copper alloys, nickel, nickel alloys, titanium, titanium alloys, silver and silver alloys, etc.) on high molecular material substrates (such as polypropylene (PP), polyethylene terephthalate (PET), polybutylene terephthalate (PBT), polystyrene (PS), and polyethylene (PE)).

In the secondary battery of the present application, the first active material layer and the second active material layer usually include a negative electrode active material and optional binder, optional conductive agent, and other optional auxiliary agents, and are usually formed by coating and drying a negative electrode slurry. The negative electrode slurry is usually formed by dispersing the negative electrode active material and optional conductive agent, binder, etc. in a solvent and stirring the mixture evenly. The solvent can be N-methyl pyrrolidone (NMP) or deionized water.

Optionally, the conductive agent can be selected from one or more of conductive carbon black, graphene, vapor grown carbon fiber VGCF, and carbon nanotube.

Optionally, the binder can be selected from one or more of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

Optionally, the other optional auxiliary agent may be a thickener, such as sodium carboxymethyl cellulose (CMC-Na).

[Positive Electrode Sheet]

The positive electrode sheet includes a positive electrode current collector and a positive electrode film layer provided on at least one surface of the positive electrode current collector, and the positive electrode film layer includes the positive electrode active material of the first aspect of the present application.

As an example, the positive electrode current collector has two opposite surfaces in its thickness direction, and the positive electrode film layer is provided on either or both of the two opposite surfaces of the positive electrode current collector.

In the present application, the positive electrode current collector may be a metal foil or a composite current collector. For example, as the metal foil, an aluminum foil can be used. The composite current collector may include a high molecular material substrate layer and a metal layer formed on at least one surface of the high molecular material substrate layer. Composite current collectors can be prepared by placing metal materials (aluminum, aluminum alloys, nickel, nickel alloys, titanium, titanium alloys, silver and silver alloys, etc.) on high molecular material substrates (such as polypropylene (PP), polyethylene terephthalate (PET), polybutylene terephthalate (PBT), polystyrene (PS), and polyethylene (PE)).

The positive electrode film layer also optionally includes a conductive agent. The types of the conductive agents are not specifically limited, and those skilled in the art can select them according to actual needs. As an example, the conductive agent for the positive electrode film layer may be one or more selected from superconducting carbon, acetylene black, carbon black, Ketjen black, carbon dots, carbon nanotubes, graphene, and carbon nanofibers.

In the present application, the positive electrode sheet can be prepared according to methods known in the art. By way of example, the positive electrode active material, the conductive agent and the binder of the present application can be dispersed in a solvent (for example, N-methyl pyrrolidone (NMP)) to form a uniform positive electrode slurry; the positive electrode slurry is coated on the positive electrode current collector, and after oven drying, cold pressing and other procedures, the positive electrode sheet is obtained.

[Electrolyte]

The electrolyte serves to conduct ions between the positive electrode sheet and the negative electrode sheet. The type of the electrolyte is not particularly limited in the present application, and can be selected according to needs. For example, the electrolyte can be selected from at least one of solid electrolyte and liquid electrolyte (i.e., electrolyte solution).

In some embodiments, the electrolyte solution is used as the electrolyte. The electrolyte solution comprises an electrolyte salt and a solvent.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis(fluorosulfonyl)imide), LiTFSI (lithium bis(trifluoromethanesulfonyl)imide), LiTFS (lithium trifluoromethanesulfonate), LiDFOB (lithium difluoro(oxalato)borate), LiBOB (lithium bis(oxalate)borate), $LiPO_2F_2$ (lithium difluorophosphate), LiDFOP (lithium difluoro bis(oxalato) phosphate) and LiTFOP (lithium tetrafluoro(oxalato)phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methylsulfonylmethane (MSM), ethyl methyl sulfone (EMS) and ethylsulfonylethane (ESE).

In some embodiments, the electrolyte solution further optionally comprises an additive. For example, the additive may include a negative electrode film-forming additive, or may include a positive electrode film-forming additive, or may further include an additive that can improve some performance of the battery, such as an additive that improves overcharge performance of the battery, an additive that improves high temperature performance of the battery, and an additive that improves low temperature performance of the battery.

[Separator]

The secondary battery using an electrolyte solution and some secondary batteries using a solid electrolyte further comprise a separator. The separator is provided between the positive electrode sheet and the negative electrode sheet, and functions to separate. There is no particular limitation on the type of the separator in the present application, and any well-known porous separator with good chemical stability and mechanical stability can be selected. In some embodiments, the material of the separator can be selected from one or more of glass fiber, non-woven cloth, polyethylene, polypropylene, and polyvinylidene fluoride. The separator may be a single-layer film or a multi-layer composite film, and is not particularly limited. When the separator is a multi-layer composite film, the layers may be made of the same or different materials, for which there is no particular limitation.

In some embodiments, the positive electrode sheet, the negative electrode sheet, and the separator may be fabricated into an electrode assembly through a winding process or a lamination process.

In some embodiments, the secondary battery may include an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft package, such as a bag-type soft package. The material of the soft package may be plastic, and examples of the plastic include polypropylene (PP), polybutylene terephthalate (PBT), polybutylene succinate (PBS), and the like.

In some embodiments of the present application, optionally, provided is a secondary battery comprising the negative electrode sheet of the first aspect of the present application or a negative electrode sheet prepared according to the method of the second aspect of the present application.

Figure 7:
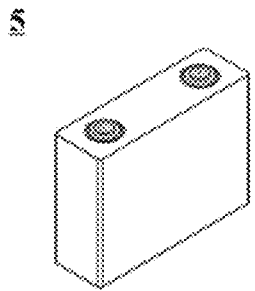
FIG. 7 is a schematic diagram of a secondary battery according to an embodiment of the present application.

The shape of the secondary battery is not particularly limited in the present application, and it may be cylindrical, square, or any other shape. For example, FIG. 7 is a secondary battery 5 of a square structure as an example.

Figure 8:
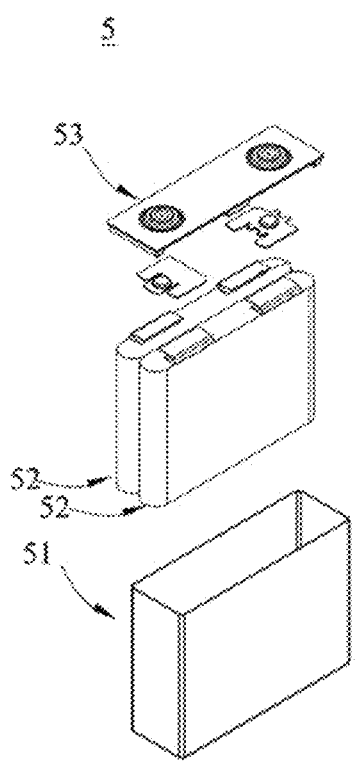
FIG. 8 is an exploded view of the secondary battery according to an embodiment of the present application as shown in FIG. 7.

In some embodiments, referring to FIG. 8, the outer package may include a case 51 and a cover plate 53. Among them, the case 51 may include a bottom plate and a side plate connected to the bottom plate, with the bottom plate and the side plate enclosing to form an accommodating cavity. The case 51 has an opening that communicates with the accommodating cavity, and the cover plate 53 can cover the opening to close the accommodating cavity. The positive electrode sheet, the negative electrode sheet, and the separator may be fabricated into an electrode assembly 52 through a winding process or a lamination process. The electrode assembly 52 is packaged in the accommodating cavity. The electrolyte solution is infiltrated into the electrode assembly 52. The number of electrode assemblies 52 comprised in the secondary battery 5 may be one or more, which can be selected by those skilled in the art according to specific actual needs.

In some embodiments of the present application, optionally, provided is a battery module comprising the secondary battery of the present application.

In some embodiments, the secondary battery can be assembled into a battery module, and the number of secondary batteries comprised in the battery module can be one or more, and the specific number can be selected by those skilled in the art according to the application and capacity of the battery module.

Figure 9:
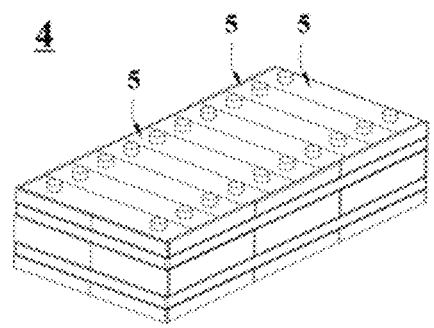
FIG. 9 is a schematic diagram of a battery module according to an embodiment of the present application.
Figure 10:
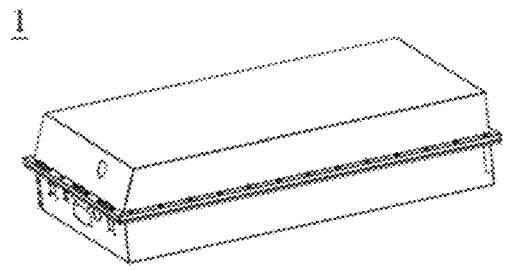
FIG. 10 is a schematic diagram of a battery pack according to an embodiment of the present application.

FIG. 9 is a battery module 4 as an example. Referring to FIG. 10, in the battery module 4, a plurality of secondary batteries 5 may be arranged in sequence along the longitudinal direction of the battery module 4. Of course, any other arrangement is also possible. Furthermore, the plurality of secondary batteries 5 can be fixed with fasteners.

Optionally, the battery module 4 may further comprise a case having an accommodating space in which the plurality of secondary batteries 5 are accommodated.

In some embodiments of the present application, optionally, provided is a battery pack comprising one or more of the secondary battery of the present application or the battery module of the present application.

In some embodiments, the battery module of the present application can be assembled into a battery pack, and the number of battery modules comprised in the battery pack can be selected by those skilled in the art according to the application and capacity of the battery pack.

Figure 11:
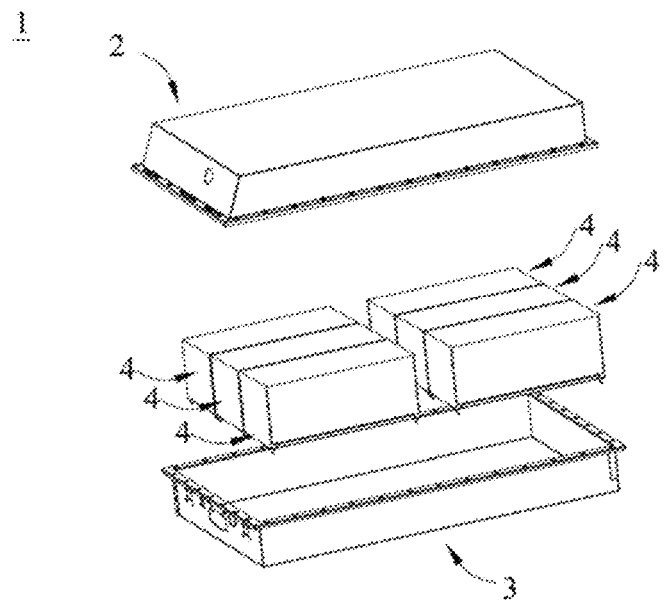
FIG. 11 is an exploded view of the battery pack according to an embodiment of the present application as shown in FIG. 10.

FIG. 10 is a battery pack 1 as an example. Referring to FIG. 11, the battery pack 1 may comprise a battery box and a plurality of battery modules 4 provided in the battery box. The battery box includes an upper box 2 and a lower box 3, wherein the upper box 2 can cover the lower box 3, and forms an enclosed space for accommodating the battery module 4. A plurality of battery modules 4 may be arranged in the battery box in any manner.

In some embodiments of the present application, optionally, provided is an electrical device comprising one or more of the secondary battery of the present application, the battery module of the present application, or the battery pack of the present application. Secondary batteries or battery modules or battery packs can be used as a power source of the electrical device or as an energy storage unit of the electrical device.

Electrical devices can be, but are not limited to, mobile devices (such as mobile phones, laptops), electric vehicles (such as all-electric vehicles, hybrid electric vehicles, plug-in hybrid electric vehicles, electric bicycles, electric scooters, electric golf carts, electric trucks), electric trains, ships and satellites, energy storage systems, and the like.

For the electrical device, the secondary battery, battery module, or battery pack can be selected according to its usage requirements.

Figure 12:
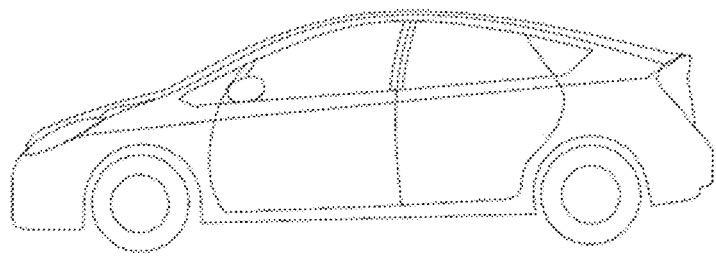
FIG. 12 is a schematic diagram of an electrical device in which a secondary battery according to an embodiment of the present application is used as a power source.

FIG. 12 shows an electrical device as an example. The electrical device is, for example, an all-electric vehicle, a hybrid electric vehicle, or a plug-in hybrid electric vehicle. In order to meet the device's high power and high energy density requirements on the secondary battery, a battery pack or battery module can be employed.

As another example, the electrical device may be a mobile phone, a tablet computer, a laptop, and the like. The device is generally required to be thin and light, and a secondary battery can be used as the power source.

EXAMPLES

Hereinafter, examples of the present application are illustrated. The examples described below are illustrative only for explaining the present application, and are not to be construed as limiting the present application. Where specific techniques or conditions are not specified in the examples, the techniques or conditions described in the literatures of the art or the product specifications are followed. Where manufacturers are not specified, the reagents or instruments used are conventional products that are commercially available.

Example 1

[Preparation of First Negative Electrode Active Material]

Raw material selection: pitch coke was put into a mechanical crusher for crushing to obtain a first precursor;

Shaping and classification: the first precursor was shaped to obtain a second precursor with a more rounded shape. The second precursor was transported to an air classifier for classification, and through instant particle size detection, a third precursor with average particle sizes $(D_v50)_1$ of 17 μm and $(D_n10)_1$ of 1 μm was obtained.

Graphitization: the shaped and classified third precursor was graphitized at a temperature of 3000° C. to obtain a fourth precursor.

Demagnetization and sieving: the fourth precursor was demagnetized by using a demagnetizer, and the large particles generated after graphitization were removed using an ultrasonic vibrating sieve to obtain the first negative electrode active material with average particle sizes $(D_v50)_1$ of 16 μm and $(D_n10)_1$ of 1 μm.

[Preparation of Second Negative Electrode Active Material]

Preparation of Graphite Component of the Second Negative Electrode Active Material Raw material selection: petroleum coke was crushed by using a mechanical crusher to obtain a first graphite precursor;

Shaping and classification: the first graphite precursor was shaped to obtain a second graphite precursor with a more rounded shape. The second graphite precursor was transported to an air classifier for classification, and through instant particle size detection, a third graphite precursor with average particle sizes $(D_v50)_2$ of 7 μm and $(D_n10)_2$ of 0.8 μm was obtained.

Granulation: the shaped and classified third graphite precursor and pitch were mixed in a mass ratio of 100:12 and then granulated at a temperature of 600° C. for 2 h to afford a fourth graphite precursor with average particle sizes $(D_v50)_2$ of 13 μm and $(Dn_{10})_2$ of 1 μm.

Graphitization: the fourth graphite precursor was graphitized at a temperature of 2800° C. to obtain a fifth graphite precursor.

Carbonization: the fifth graphite precursor and pitch were mixed in a mass ratio of 100:6, and then carbonized at 1150° C. to obtain a sixth graphite precursor.

Demagnetization and sieving: the sixth graphite precursor was demagnetized by using a demagnetizer, and the large particles generated after carbonization were removed using an ultrasonic vibrating sieve to obtain the second negative electrode active material with average particle sizes $(D_v50)_2$ of 13 μm and $(D_n10)_2$ of 1 μm.

Preparation of silicon component of the second negative electrode active material Using a CVD rotary furnace and using acetylene as the carbon source, the silicon precursor $SiO_x$ (0.5<x<0.9) was subjected to carbon cladding by vapor deposition method, with a heat treatment temperature of 900° C., heat treatment time of 4 h, carbon source gas flow rate of 1 L/min, and carbon cladding amount of 4 wt %, thereby obtaining the silicon component in the second negative electrode active material.

Preparation of Second Negative Electrode Active Material

After obtaining the appropriate graphite component and the appropriate silicon component respectively, the two components were placed into a high-efficiency mixer and mixed for 1 h to obtain the second negative electrode active material having average particle sizes $(D_v50)_2$ of 13 μm and $(D_n10)_2$ of 1 μm.

[Preparation of Negative Electrode Sheet]

The first negative electrode active material, conductive carbon black, a thickener sodium carboxymethyl cellulose, and a binder styrene-butadiene rubber were mixed in a mass ratio of 96.2:1.0:1.0:1.8, then deionized water was added thereto, and the mixture was stirred in a vacuum mixer until it became homogeneous, thereby obtaining a negative electrode slurry A with a solid content of 52%. The negative electrode slurry A was uniformly coated on a negative electrode current collector copper foil, and oven dried at 85° C. to obtain a negative electrode sheet coated with the first negative electrode active material.

The second negative electrode active material, carbon nanotubes, the thickener sodium carboxymethyl cellulose, and the binder styrene-butadiene rubber were mixed in a mass ratio of 96.2:1.0:1.0:1.8, then deionized water was added thereto, and the mixture was stirred in a vacuum mixer until it became homogeneous, thereby obtaining a negative electrode slurry B with a solid content of 52%. The negative electrode slurry B was uniformly coated on a first negative electrode film layer, and over dried at 85° C.

The above-mentioned negative electrode sheet coated with the first negative electrode active material and the second negative electrode active material was subjected to the processes of cold pressing, edge trimming, slitting and cutting sequentially, and then further oven dried under vacuum at 120° C. for 12 h to obtain the target negative electrode sheet. As tested, the thickness $T_1$ of the first active material layer is 30 μm, and the thickness $T_2$ of the second active material layer is 35 μm.

The difference between Examples 2 to 13, Comparative Examples 1 to 6 and Example 1 only lies in the difference in specific numerical values between the particle sizes $(D_v50)_1$ and $(D_n10)_1$ of the first negative electrode active material and the particle sizes $(D_v50)_2$ and $(D_n10)_2$ of the second negative electrode active material corresponding to each of the examples, and for specific numerical values, refer to Table 1.

The difference between Examples 14 to 21 and Example 1 only lies in the difference in specific numerical values between the thickness $T_1$ of the first active material layer and the thickness $T_2$ of the first active material layer corresponding to each of the examples, and for specific numerical values, refer to Table 2.

The difference between Example 22 and Example 1 only lies in the difference in specific numerical values of the parameters $(T_2/T_1) \times (A_2/A_1)$ corresponding to each of the examples, and for specific numerical values, refer to Table 3.

The difference between Examples 23 to 26 and Example 1 only lies in the difference in specific numerical values of silicon monoxide content corresponding to each of the examples, and for specific numerical values, refer to Table 4.

[Preparation of Positive Electrode Sheet]

The positive electrode NCM ternary material, a conductive agent Super P, and a binder polyvinylidene fluoride were mixed in a mass ratio of 97:1.5:1.5, the solvent N-methyl pyrrolidone was added, and the system was stirred under vacuum until it became uniform, thereby obtain a positive electrode slurry with a solid content of 77 wt %. The positive electrode slurry was uniformly coated on the positive electrode current collector aluminum foil, and oven dried at 85° C. After cold pressing, edge trimming, slitting, cutting, and oven drying under vacuum at 85° C. for 4 h, the positive electrode sheet was obtained.

[Preparation of Electrolyte Solution]

Ethylene carbonate, ethyl methyl carbonate and diethyl carbonate were formulated into a mixed solution in a volume ratio of 20:20:60, a fully dried lithium salt was dissolved in the above mixed solution, then 10 wt % of fluoroethylene carbonate as an additive was added, and the system was mixed uniformly to obtain an electrolyte solution. The concentration of the lithium salt was 1 mol/L. The entire process was carried out in an argon atmosphere glove box with a water content of <10 ppm.

[Separator]

Preparation of Separator

A polyethylene film with a thickness of 12 μm was used as a substrate, and a coating of 2 m was applied on the surface of the substrate as a separator.

[Preparation of Secondary Battery]

The negative electrode sheet, separator, and positive electrode sheet in each of Examples 1 to 21 and Comparative Examples 1 to 6 were stacked in sequence, with the separator between the positive and negative electrode sheets, and then wound into a bare battery cell. Tabs were soldered to the bare battery cell, and the bare battery cell was put into an aluminum case and baked at 80° C. to remove water. Then, an electrolyte solution was injected, and the case was sealed to obtain an uncharged secondary battery. The uncharged secondary battery then went through the processes of standing, hot and cold pressing, chemical formation, shaping, capacity testing, etc. in sequence, to obtain a secondary battery product. Its shipment battery capacity is 50% SOC.

[Negative Electrode Sheet Parameter Test]

1. Particle Size Test of the First Negative Electrode Active Material and the Second Negative Electrode Active Material The particle sizes of powder 1 and powder 2 corresponding to each of the examples and comparative examples were measured by a laser diffraction particle size distribution measuring instrument (Mastersizer3000) according to the test method of GB/T19077-2016.

2. Thickness Test of the First Negative Electrode Active Material and the Second Negative Electrode Active Material The negative electrode sheet corresponding to each of the examples and comparative examples was cut into a size of 6 mm×6 mm, and polished with an ion polisher from Leica, Germany, at 7.5 KV for 90 min. Then, the thickness of each layer was measured using a scanning electron microscope (ZEISS Sigma300) according to the JY/T010-1996 standard.

[Battery Performance Test]

1. Energy Density Test

At 25° C., the batteries prepared in the examples and comparative examples were fully discharged at 1 C, then fully charged at a rate of 1 C, fully discharged at a rate of 1 C, and the actual discharge energy at this point was recorded. At 25° C., the battery was weighed using an electronic balance. The ratio of the actual discharge energy D/Wh of the battery at 1 C to the battery weight m/kg represents the actual energy density E of the battery, E=D/m.

2. Fast Charge Performance Test

At 25° C., the secondary battery to be tested for fast charge performance was charged at a constant current of 0.33 C (that is, the current value at which the theoretical capacity is fully released within 1 h) to a charge cut-off voltage of 4.25V, and then charged at a constant voltage to a current of 0.05 C. After standing for 5 min, the battery was discharged at 0.33 C constant current to a discharge cut-off voltage V2, and its actual capacity was recorded as C0.

Then, the battery was charged at a constant current of 0.3 C0, 0.5 C0, 1.0 C0, 1.5 C0, 2.0 C, and 2.5 C0 to the full battery charge cut-off voltage of 4.25V or 0V negative electrode cut-off potential (whichever comes first). After completion of each charge, it needed to be discharged at 1 C0 to the full battery discharge cut-off voltage of 2.8V. The negative electrode potentials corresponding to charging to 10% SOC, 20% SOC, 30% SOC, . . . , 80% SOC under different charging rates were recorded.

Figure 6:
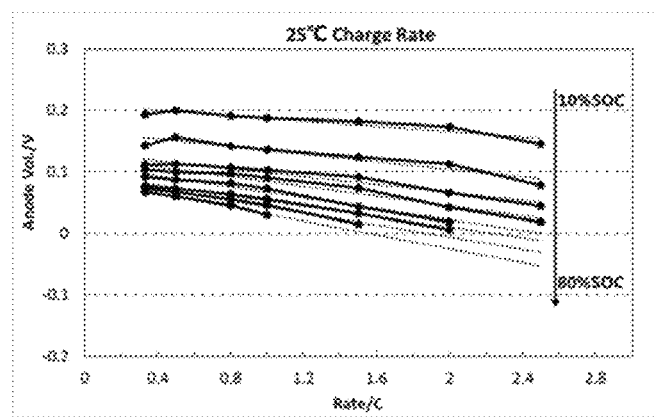
FIG. 6 a graph showing the charge-discharge rate vs negative electrode potential of a secondary battery prepared from the negative electrode sheet in Example 1 of the present application under different SOC states.

The rate-negative electrode potential curve under different SOC states was drawn (refer to FIG. 6). After linear fitting, the corresponding charging rate (C=−intercept/slope) when the negative electrode potential was 0V under different SOC states was obtained. The charging rate was the charge window under that SOC state, and the charge windows at 10% SOC, 20% SOC, 30% SOC, . . . , 80% SOC are respectively recorded as $C_{10\% \ SOC}$, $C_{20\% \ SOC}$, $C_{30\% \ SOC}$, $C_{40\% \ SOC}$, $C_{50\% \ SOC}$, $C_{60\% \ SOC}$, $C_{70\% \ SOC}$, $C_{80\% \ SOC}$; according to the formula $(60/C_{10\% \ SOC}+60/C_{20\% \ SOC}+60/C_{30\% \ SOC}+60/C_{40\% \ SOC}+60/C_{50\% \ SOC}+60/C_{60\% \ SOC}+60/C_{70\% \ SOC}+60/C_{80\% \ SOC})\times 10\%$, the time T (min) taken to charge the battery from 10% SOC to 80% SOC was calculated. The shorter the time, the better the fast charge capacity of the battery. Taking Example 5 as an example, the rate-negative electrode potential curves under different SOC states are shown in FIG. X.

According to the fitting formula of each of the curves: the values of $C_{10\% \ SOC}$, $C_{20\% \ SOC}$, $C_{30\% \ SOC}$, $C_{40\% \ SOC}$, $C_{50\% \ SOC}$, $C_{60\% \ SOC}$, $C_{70\% \ SOC}$, $C_{80\% \ SOC}$ are 9.74, 5.34, 4.08, 3.11, 2.49, 2.23, 1.88, and 1.57 respectively, and the charge time T=(60/9.74+60/5.34+60/4.08+/60/3.11+60/2.49+60/2.49+60/2.23+60/1.88+60/1.57)×10%=17.3 min.

TABLE 1

Effect of particle size of the first negative electrode active material and the second negative electrode active material on battery performance

| Parameter Layer | Dv50/um $(Dv50)_1$ | $(Dv50)_2$ | Dn10/pm $(Dn10)_1$ | $(Dn10)_2$ | A $A_1$ | $A_2$ | $A_2/A_1$ / | Energy density /Wh /kg | Fast charge time /min |
|---|---|---|---|---|---|---|---|---|---|
| Example 1 | 16 | 13 | 1 | 1 | 0.06 | 0.08 | 1.23 | 255 | 15.6 |
| Example 2 | 20 | 13 | 1 | 1 | 0.05 | 0.08 | 1.54 | 252 | 16.5 |
| Example 3 | 16 | 8 | 1 | 1 | 0.06 | 0.13 | 2 | 253 | 16.4 |
| Example 4 | 12 | 8 | 1 | 1 | 0.08 | 0.13 | 1.5 | 252 | 17 |
| Example 5 | 20 | 17 | 1 | 1 | 0.05 | 0.06 | 1.18 | 251 | 17.3 |
| Example 6 | 16 | 13 | 0.5 | 1 | 0.03 | 0.08 | 2.46 | 252 | 16 |
| Example 7 | 16 | 13 | 1 | 2 | 0.06 | 0.15 | 2.46 | 253 | 15.9 |
| Example 8 | 16 | 13 | 0.5 | 0.5 | 0.03 | 0.04 | 1.23 | 251 | 16.3 |
| Example 9 | 16 | 13 | 2 | 2 | 0.13 | 0.15 | 1.23 | 253 | 16.1 |
| Example 10 | 16 | 8 | 2 | 2 | 0.13 | 0.25 | 2 | 251 | 16.6 |
| Example 11 | 12 | 8 | 2 | 2 | 0.17 | 0.25 | 1.5 | 249 | 16.8 |
| Example 12 | 21 | 13 | 1 | 1 | 0.05 | 0.08 | 1.62 | 251 | 20.0 |
| Example 13 | 16 | 7 | 1 | 1 | 0.06 | 0.14 | 2.2 | 250 | 19.5 |
| Comparative Example 1 | 11 | 13 | 1 | 1 | 0.09 | 0.08 | 0.85 | 247 | 25.3 |
| Comparative Example 2 | 16 | 18 | 1 | 1 | 0.06 | 0.05 | 0.83 | 252 | 25.7 |
| Comparative Example 3 | 16 | 13 | 0.3 | 1 | 0.02 | 0.08 | 4.1 | 254 | 21.1 |
| Comparative Example 4 | 16 | 13 | 1 | 2.2 | 0.06 | 0.17 | 2.71 | 253 | 20.7 |
| Comparative Example 5 | 16 | 13 | 2.2 | 1 | 0.14 | 0.08 | 0.56 | 248 | 20.3 |
| Comparative Example 6 | 16 | 13 | 1 | 0.3 | 0.06 | 0.02 | 0.37 | 251 | 22.1 |

Note:
First active materia layer thickness $T_1 = 30$;
second active material layer thickness $T_2 = 35$;
the content of silicon monoxide in the second negative electrode active material was 8%

TABLE 2

Effect of thickness of the first active material layer and thickness of the second active material layer on battery performance parameters

| Parameter Layer | T $T_1$ | $T_2$ | $T_2/T_1$ | Energy density/ Wh/kg | Fast charge time/min |
|---|---|---|---|---|---|
| Example 1 | 30 | 35 | 1.17 | 255 | 15.6 |
| Example 14 | 20 | 35 | 1.75 | 250 | 16.1 |
| Example 15 | 30 | 70 | 2.33 | 256 | 18.3 |
| Example 16 | 60 | 70 | 1.17 | 257 | 19.7 |
| Example 17 | 20 | 25 | 1.25 | 250 | 15.2 |
| Example 18 | 65 | 35 | 0.54 | 258 | 26.7 |
| Example 19 | 30 | 20 | 0.67 | 248 | 20.9 |
| Example 20 | 15 | 35 | 2.33 | 249 | 20.8 |
| Example 21 | 30 | 75 | 2.50 | 246 | 20.9 |

Note
$(Dv50)_1 = 16$; $(Dv50)_2 = 13$; $(Dn10)_1 = (Dn10)_2 = 1$; $A_1 = 0.06$; $A_2 = 0.08$; $A_2/A_1 = 1.23$; the content of silicon monoxide in the second negative electrode active material was 8%

TABLE 3

Effect of $(T_2/T_1) \times (A_2/A_1)$ on battery performance parameters

| Parameter | $A_2/A_1$ | $T_2/T_1$ | $(T_2/T_1) \times (A_2/A_1)$ | Energy density/ Wh/kg | Fast charge time/min |
|---|---|---|---|---|---|
| Example 1 | 1.23 | 1.17 | 1.44 | 255 | 15.6 |
| Example 5 | 1.18 | 1.17 | 1.38 | 251 | 17.2 |
| Example 3 | 2.00 | 1.17 | 2.33 | 253 | 16.4 |
| Example 15 | 1.23 | 2.33 | 2.87 | 256 | 18.3 |
| Example 22 | 2.46 | 2.33 | 5.72 | 248 | 19.0 |

Note
In the examples, $(Dv50)_1 = 16$; $(Dv50)_2 = 13$; $(Dn10)_1 = 0.5$; $(Dn10)_2 = 1$; first active material layer thickness $T_1 = 30$; second active material layer thickness $T_2 = 35$; $A_1 = 0.06$; $A_2 = 0.08$;
In other example 22, $(Dv50)_1 = 16$; $(Dv50)_2 = 13$; $(Dn10)_1 = (Dn10)_2 = 1$; $A_1 = 0.06$; $A_2 = 0.08$; $A_2/A_1 = 2$; first active material layer thickness $T_1 = 30$; second active material layer thickness $T_2 = 35$; the content of silicon monoxide in the second negative electrode active material was 8%

TABLE 4

Effect of silicon monoxide content in the second negative electrode active material on battery performance parameters

| Parameter | Silicon monoxide content | Energy density/ Wh/kg | Fast charge time/min |
|---|---|---|---|
| Example 1 | 8% | 255 | 15.6 |
| Example 23 | 1% | 243 | 14.9 |
| Example 24 | 20% | 276 | 19.8 |

TABLE 4-continued

Effect of silicon monoxide content in the
second negative electrode active material on
battery performance parameters

| Parameter | Silicon monoxide content | Energy density/ Wh/kg | Fast charge time/min |
|---|---|---|---|
| Example 25 | 0% | 238 | 15.9 |
| Example 26 | 25% | 283 | 22.7 |

Note
$(Dv50)_1 = 16$; $(Dv50)_2 = 13$; $(DnIO)_i=(Dn10)_2 = 1$; $A_1 = 0.06$; $A_2 = 0.08$; first active material layer thickness $T_1 = 30$; second active material layer thickness $T_2 = 35$

[Analysis of the Effect of Particle Size on Battery Performance]

It can be seen from Table 1 that the values of parameters $A_1$, $A_2$ and $A_2/A_1$ corresponding to Examples 1 to 13 were all within the scope of the present application. It can be seen from the experimental data that the secondary batteries corresponding to Examples 1 to 13 had high energy density, and the fast charge time of each of them was shorter than that of Comparative Examples 1 to 6, all within 20 min. Therefore, when the particle sizes of the first active material and the second active material on the negative electrode sheet satisfied $0.02 \leq A_1 \leq 10.2$, $0.02 \leq A_2 \leq 0.3$ and $1 < A_2/A_1 < 2.5$ simultaneously, the secondary battery prepared using this negative electrode sheet had both high energy density and fast charge performance.

Although Examples 12 and 13 satisfied $0.02 \leq A_1 \leq 0.2$, $0.02 \leq A_2 \leq 0.3$ and $1 < A_2/A_1 < 2.5$, the average particle size $(Dv50)_1$ of the corresponding first negative electrode active material was large (greater than 20 μm) and the average particle size $(Dv50)_2$ of the second negative electrode active material was small (less than 8 μm), which correspondingly leaded to a relatively low porosity of the first active material layer (low lithium ion migration rate in the first active material layer) and a relatively high porosity of the second active material layer (low compaction density of the material of the second active material layer), resulting in a relatively low energy density of the corresponding secondary battery, which had a certain impact on the fast charge performance of the battery.

Compared with the examples, in Comparative Example 1, the average particle size $(Dv50)_1$ of the first negative electrode active material was small (less than 12 μm), and the corresponding $A_1$ at this point was greater than $A_2$, $A_2/A_1 < 1$, indicating that in this case, the compaction density of the first negative electrode active material in the first active material layer was low, and its porosity was greater than that of the second active material layer, so that the overall gram capacity of the negative electrode sheet material was low, and the overall fast charge performance of the battery was affected. Therefore, the secondary battery corresponding to Comparative Example 1 had a low energy density.

Compared with the examples, in Comparative Example 2, the average particle size $(Dv50)_2$ of the second negative electrode active material was large (greater than 17 μm), and the corresponding $A_1$ at this point was larger than $A_2$, $A_2/A_1 < 1$, indicating that in this case, the porosity of the second active material layer was low, and the diffusion resistance of lithium ions and electrons in the second active material layer was large. For a secondary battery, the internal resistance of the battery would increase accordingly. Therefore, the fast charge time was significantly longer than that of the examples and the fast charge performance of the battery was poor.

Compared with the examples, in Comparative Example 3, the $(D_n10)_1$ of the first active material layer was small (less than 0.5 μm), so that the porosity in the first active material layer was low, which affected the overall pore content of the electrode sheet and in turn leaded to poor fast charge performance. On the contrary, in Comparative Example 5, the $(D_n10)_1$ of the first active material layer was large (greater than 2 μm), so that the porosity in the first active material layer was high, and the gram capacity of the material was correspondingly reduced, which in turn leaded to low overall compaction density of the electrode sheet, thereby reducing the energy density of the battery.

Compared with the examples, in Comparative Example 4, the $(D_n10)_2$ of the second negative electrode active material was large (greater than 2 μm), and $A_2/A_1$ was also larger than 2.5, which indicated that the porosity in the second active material layer was too high, the compaction density of the second negative electrode active material was low, resulting in a low overall energy density of the battery and a certain impact on the fast charge capacity.

Compared with the examples, in Comparative Example 6, the $(D_n10)_2$ of the second negative electrode active material was low (less than 0.5 μm), and $A_2/A_1$ was also less than 1, which indicated that the porosity in the second active material layer was too low, the diffusion resistance of lithium ions in the second active material layer was large, resulting in relatively poor fast charge performance.

[Analysis of Effect of Active Material Layer Thickness on Battery Performance Parameters]

It can be seen from Table 2 that for Example 1 and Examples 14 to 17, the thickness $T_1$ of the first active material layer and the thickness $T_2$ of the second active material layer were both within the ranges required by the present application. Although in Examples 15 and Example 16, the increase in the overall thickness had a slight impact on the fast charge performance of the battery, the overall charge time could still be maintained within 20 min. In addition, the ratio of the thickness $T_2$ of the second active material layer to the thickness $T_1$ of the first active material layer was also within the range required by the present application, and the secondary battery as a whole had excellent energy density and fast charge performance.

For Example 18, the thickness of the first active material layer was too large ($T_1$ being greater than 60 μm), which was greater than the thickness of the second active material layer, and $T_2/T_1$ was less than 1.1, indicating that the porosity of the second active material layer having a relatively high porosity was low. As a result, the electrode sheet as a whole had a relatively low pore content, and the fast charge performance was significantly reduced. In Example 19, the thickness of the second active material layer was low relative to that of the first active material layer, and $T_2/T_1$ was less than 1.1, so the overall pore content of the electrode sheet was low, and the fast charge capacity was slightly deteriorated. In Example 20, although the ratio of $T_2/T_1$ was appropriate, the first active material layer was thin, which indicated that the first active material layer with relatively high gram capacity contributed less to the energy density of the battery, having a certain impact on the energy density of the secondary battery. In Example 21, the thickness of the first active material layer was moderate, but the thickness of the second active material layer with a relatively high porosity was large ($T_2$ being greater than 70 μm), and $T_2/T_1$ was too large. As a result, the electrode sheet as a whole has relatively low compaction density and significantly decreased energy density.

[Analysis of Effect of $(T_2/T_1)\times(A_2/A_1)$ on Battery Performance Parameters]

It can be seen from Table 3 that for Example 1 and Examples 3 and 15, the numerical value ranges of $(T_2/T_1)\times(A_2/A_1)$ were all within the range required by the present application, that is, the relative thicknesses of the two layers of the negative electrode sheet and the relative porosities of the two layers of the negative electrode sheet satisfied the requirements of the present application, so the secondary battery as a whole had excellent energy density and fast charge performance.

For Example 15, the value of the parameter $(T_2/T_1)\times(A_2/A_1)$ was too high (higher than 2.9), indicating that the overall compaction density of the electrode sheet at this point was relatively poor, and the overall energy density of the battery was relatively poor.

[Analysis of Effect of Silicon Monoxide Content on Battery Performance]

It can be seen from Table 4 that in Example 1, the content of silicon was moderate, and the electrode sheet had both high energy density and fast charge capacity; in Example 23, the content of silicon monoxide in the second negative electrode active material was lower than that in Example 1, so the energy density was low, but the fast charge capacity was better. In Example 24, the content of silicon monoxide in the second negative electrode active material was higher than that in Example 1, and the energy density was higher, but the fast charge capacity was affected to a certain extent. However, when the silicon monoxide content was within the scope of the present application, the secondary battery as a whole in the example had both high energy density and fast charge performance.

For Example 25, the second negative electrode active material did not contain the silicon component but only pure graphite component, so the energy density of the secondary battery was low, but it had little effect on the fast charge performance. In Example 26, the content of silicon monoxide in the second negative electrode active material was too high (higher than 20%), indicating that excessive silicon would deteriorate the migration rate of lithium ions and electrons in the second active material layer. Therefore, when the content of silicon monoxide in the second negative electrode active material is relatively high, the energy density of the secondary battery is relatively high, but its fast charge performance is relatively poor.

It should be noted that the present application is not limited to the above-described embodiments. The above-described embodiments are merely illustrative, and all the embodiments that have substantially the same configuration and exert the same effects as the technical idea within the technical solutions of the present application are included in the technical scope of the present application. In addition, without departing from the gist of the present application, various modifications to the embodiments that can be conceived by those skilled in the art, and other embodiments constructed by combining some of the constituent elements of the embodiments are also included in the scope of the present application.

What is claimed is:

1. A negative electrode sheet, comprising:
   a current collector; and
   a first active material layer and a second active material layer that are sequentially provided on at least one surface of the current collector;
   wherein:
   the first active material layer includes a first negative electrode active material, particle sizes of the first negative electrode active material satisfying formula (I): $0.02 \leq A_1 = (Dn10)_1/(Dv50)_1 \leq 0.2$, formula (I);
   the second active material layer includes a second negative electrode active material, particle sizes of the second negative electrode active material satisfying formula (II): $0.02 \leq A_2 = (Dn10)_2/(Dv50)_2 \leq 0.3$, formula (II); and
   in the formula (I) and the formula (II), $A_1$ and $A_2$ satisfy $1 < A_2/A_1 < 2.5$.

2. The negative electrode sheet according to claim 1, wherein:
   $(D_v50)_1$ of the first negative electrode active material is 12 μm to 20 μm.

3. The negative electrode sheet according to claim 1, wherein:
   $(D_v50)_2$ of the second negative electrode active material is 8 μm to 17 μm.

4. The negative electrode sheet according to claim 1, wherein:
   $(D_n10)_1$ of the first negative electrode active material is 0.5 μm to 2 m; and
   $(D_n10)_2$ of the second negative electrode active material is 0.5 μm to 2 μm.

5. The negative electrode sheet according to claim 1, wherein:
   $(D_v50)_2$ of the second negative electrode active material is smaller than $(D_v50)_1$ of the first negative electrode active material, and a difference between $(D_v50)_1$ and $(D_v50)_2$ is not less than 3 μm.

6. The negative electrode sheet according to claim 1, wherein:
   a thickness $T_1$ of the first active material layer is 20 μm to 60 μm.

7. The negative electrode sheet according to claim 1, wherein:
   a thickness $T_2$ of the second active material layer is 25 μm to 70 μm.

8. The negative electrode sheet according to claim 7, wherein:
   the thickness $T_2$ of the second active material layer is not less than a thickness $T_1$ of the first active material layer.

9. The negative electrode sheet according to claim 7, wherein:
   a ratio of the thickness $T_2$ of the second active material layer to a thickness $T_1$ of the first active material layer is 1.1 to 2.4.

10. The negative electrode sheet according to claim 9, wherein:
    a product of $T_2/T_1$ and $A_2/A_1$ satisfies: $1.1 \leq (T_2/T_1)\times(A_2/A_1) \leq 2.9$.

11. The negative electrode sheet according to claim 1, wherein:
    the first negative electrode active material includes graphite; and/or
    the second negative electrode active material includes graphite and silicon.

12. The negative electrode sheet according to claim 11, wherein:
    in the second negative electrode active material, in terms of mass percentage, a content of silicon converted into silicon monoxide accounts for 1-20% of the second negative electrode active material.

13. The negative electrode sheet according to claim 11, wherein:
    graphite in the first negative electrode active material and the second negative electrode active material is selected from artificial graphite, and the artificial graphite is primary particle and/or secondary particle.

14. A method for preparing a negative electrode sheet, comprising:

Step S1: providing a first negative electrode active material, particle sizes of the first negative electrode active material satisfying formula (I): $0.02 \leq A_1 = (Dn10)_1/(Dv50)_1 \leq 0.2$, formula (I);

Step S2: preparing a slurry A containing the first negative electrode active material;

Step S3: providing a second negative electrode active material, particle sizes of the second negative electrode active material satisfying formula (II): $0.02 \leq A_2 = (Dn10)_2/(Dv50)_2 \leq 0.3$, formula (II);

Step S4: preparing a slurry B containing the second negative electrode active material;

Step S5: coating the slurry A on at least one surface of a current collector to form a first active material layer;

coating the slurry B on a surface of the first active material layer to form a second active material layer; and conducting oven drying, cold pressing, slitting, and die cutting to obtain the negative electrode sheet;

wherein $A_1$ and $A_2$ satisfy $1 < A_2/A_1 < 2.5$.

15. The method according to claim 14, wherein:

in the step S1, the first negative electrode active material is prepared by processes of raw material selection, shaping and classification, graphitization, and demagnetization and sieving sequentially to obtain the first negative electrode active material with an average particle size $(D_v50)_1$ from 12 μm to 20 μm and $(D_n10)_1$ from 0.5 μm to 2 μm.

16. The method according to claim 14, wherein:

in the step S3, the second negative electrode active material includes graphite and silicon;

the graphite is prepared by processes of raw material selection, shaping and classification, granulation, graphitization, carbonization, and demagnetization and sieving sequentially, and preparation of the silicon comprises a process of carbon cladding; and the graphite and the silicon are mixed to obtain the second negative electrode active material with an average particle size $(D_v50)_2$ from 8 μm to 17 μm and $(D_n10)_1$ from 0.5 μm to 2 μm.

17. The method according to claim 14, wherein:

in the step S2 and the step S4, a conductive agent comprises one or more of conductive carbon black, graphene, vapor grown carbon fiber VGCF, and carbon nanotube.

18. The method according to claim 14, wherein:

in the step S4, the second negative electrode active material includes silicon and graphite; and a conductive agent includes graphene or carbon nanotube.

19. A secondary battery, comprising a negative electrode sheet including:

a current collector; and a first active material layer and a second active material layer that are sequentially provided on at least one surface of the current collector;

wherein:

the first active material layer includes a first negative electrode active material, particle sizes of the first negative electrode active material satisfying formula (I): $0.02 \leq A_1 = (Dn10)_1/(Dv50)_1 \leq 0.2$, formula (I);

the second active material layer includes a second negative electrode active material, particle sizes of the second negative electrode active material satisfying formula (II): $0.02 \leq A_2 = (Dn10)_2/(Dv50)_2 \leq 0.3$, formula (II); and in the formula (I) and the formula (II), $A_1$ and $A_2$ satisfy $1 < A_2/A_1 < 2.5$.

* * * * *